(12) United States Patent
Dhoke et al.

(10) Patent No.: US 12,063,011 B2
(45) Date of Patent: Aug. 13, 2024

(54) SOLAR FARM FAULT DETECTION AND DIAGNOSIS

(71) Applicant: THE UNIVERSITY OF QUEENSLAND, Brisbane (AU)

(72) Inventors: Amit Dhoke, Brisbane (AU); Rahul Sharma, Brisbane (AU); Tapan Kumar Saha, Brisbane (AU)

(73) Assignee: THE UNIVERSITY OF QUEENSLAND, Brisbane (AU)

( * ) Notice: Subject to any disclaimer, the term of this patent is extended or adjusted under 35 U.S.C. 154(b) by 315 days.

(21) Appl. No.: 17/290,134

(22) PCT Filed: Oct. 31, 2019

(86) PCT No.: PCT/AU2019/051203
§ 371 (c)(1),
(2) Date: Apr. 29, 2021

(87) PCT Pub. No.: WO2020/087128
PCT Pub. Date: May 7, 2020

(65) Prior Publication Data
US 2023/0299715 A1   Sep. 21, 2023

(30) Foreign Application Priority Data
Oct. 31, 2018   (AU) ................................ 2018904145

(51) Int. Cl.
*H02S 50/10*   (2014.01)
(52) U.S. Cl.
CPC .................................. *H02S 50/10* (2014.12)
(58) Field of Classification Search
CPC ........... H02S 50/00; H02S 50/10; Y02E 10/50
See application file for complete search history.

(56) References Cited

U.S. PATENT DOCUMENTS 10,340,849 B2 *  7/2019  Kouno .................... H02S 50/10
10,826,428 B1 *  11/2020  Abusorrah ............. G01R 21/06
(Continued)

FOREIGN PATENT DOCUMENTS

EP   3 282 578   2/2018

OTHER PUBLICATIONS

Jul. 11, 2022 Search Report issued in EP Patent Application No. 19878817.6 [pp. 1-6].
(Continued)

*Primary Examiner* — An H Do
(74) *Attorney, Agent, or Firm* — Nixon & Vanderhye PC

(57) ABSTRACT

A fault detection assembly for a PV solar generation assembly comprised of an array of PV modules including a plurality of series PV module strings connected in parallel, the fault detection assembly including: a plurality of current sensors arranged to monitor respective string currents of said strings; a processing arrangement in communication with the current sensors for receiving values of the string currents therefrom; a memory device accessible to the processing arrangement containing instructions for execution by the processing arrangement including instructions for: determining a representative string current for currents of the plurality of strings; deeming one or more strings having currents that are outliers to the representative string current by more than a threshold value to be subject to a fault; and issuing an alarm including an identification of the one or more strings deemed to be subject to the fault.

22 Claims, 17 Drawing Sheets

(56) References Cited

U.S. PATENT DOCUMENTS

| | | |
|---|---|---|
| 2011/0141644 A1 | 6/2011 | Hastings et al. |
| 2012/0049879 A1 | 3/2012 | Crites |
| 2012/0134058 A1 | 5/2012 | Pamer et al. |
| 2013/0015875 A1 | 1/2013 | Kumar |
| 2015/0288331 A1 | 10/2015 | Strobl et al. |

OTHER PUBLICATIONS

Ye Zhao, et al., "Fault Experiments in a Commercial-Scale PV Laboratory and Fault Detection Using Local Outlier Factor", 2014 IEEE 40th Photovoltaic Specialist Conference (PVSC), IEEE, Jun. 2014, pp. 3398-3403 (7 pages).

Ye ZHAO, et al., "Outlier Detection Rules for Fault Detection in Solar Photovoltaic Arrays", 2013 Twenty-Eighth Annual IEEE Applied Power Electronics Conference and Exposition (APEC), IEEE, Mar. 2013, pp. 2913-2920 (9 pages).

International Search Report for PCT/AU2019/051203 dated Jan. 14, 2020, 5 pages.

Written Opinion of the ISA for PCT/AU2019/051203 dated Jan. 14, 2020, 5 pages.

\* cited by examiner

SOLAR FARM FAULT DETECTION AND DIAGNOSIS

RELATED APPLICATIONS

This application is the U.S. national phase of International Application No. PCT/AU2019/051203 filed Oct. 31, 2019 which designated the U.S. and claims priority to AU Patent Application No. 2018904145 filed Oct. 31, 2018, the entire contents of each of which are hereby incorporated by reference.

TECHNICAL FIELD

The present invention concerns a method and apparatus for detecting faults in large arrays of PV modules of PV power generation assemblies or as they are sometimes called "solar farms".

BACKGROUND ART

Any references to methods, apparatus or documents of the prior art are not to be taken as constituting any evidence or admission that they formed, or form part of the common general knowledge.

FIG. 1 is a block diagram of a fault free, typical photovoltaic (PV) power generation assembly or "solar farm" 1. By "fault free" it is meant that all of the electrical connections in the PV assembly 1 are in good order and not subject to fault conditions such as inadvertent short circuits or open circuits. The PV assembly 1 includes a PV array 3 that is comprised of n parallel strings 5-1, ..., 5n, each comprised of m series connected PV modules 7-11, ..., 7-nm so that the array 3 includes a total of nm PV modules. The PV modules 7 comprise solar panels which are each made up of a number of interconnected solar cells. Depending on the degree of solar radiation and the physical and electrical properties and interconnection of the solar cells of each panel, each PV module generates electricity, for example according to the specifications set out in Table 1.

TABLE 1

Specification of PV Modules 7

| Parameter | Value |
|---|---|
| Cells per module | 60 |
| Module peak power (MPP) ($P_{max}$) | 240 W |
| Open circuit voltage($V_{oc}$) | 37.2 V |
| Short Circuit current($I_{sc}$) | 8.37 A |
| Voltage at MPP | 30.4 V |
| Current at MPP | 7.89 A |
| Temperature coefficient of $V_{oc}$ | −0.35%/° C. |
| Temperature coefficient of $I_{sc}$ | 0.05%/° C. |

Each string 5-1, ..., 5-n has a positive end (at the top of the string as depicted in FIG. 1) and a negative end (at the bottom of the string as depicted in FIG. 1) and includes a return or negative" line cable 9 from the negative end that runs along the PV modules to the positive end.

The strings 5-1, ..., 5-n are connected in parallel to an Inverter 13 via over-current protection devices 8-1, ..., 8-n, connection box 11 and ground fault protection device 12, all of which are well known in the prior art. Inverter 13 converts the DC power from the strings 5-1, ..., 5-n into AC power which is suitable for feeding into a grid utility 15.

The voltage generated between the ends of each string 5 is m×V where V is the voltage across each individual module 7. The total current flowing out of the array is n×I where I is the current through each string. Due to the structure of array 3, the same current is produced by each module in the string and each string in the array has the same voltage across it. For the given array 3, total output power ($P_{out}$) can be evaluated as (m×V)×(n×I).

Referring now to FIG. 2, the PV generator assembly or "solar farm" 1 is shown in which an intra-string fault F1 has arisen in string 5-2 of array 3. Fault F1 comprises a short circuit (or low resistance path) between the interconnection of PV modules 7-22 and 7-23 and the return cable 9-2. Fault F1 effectively causes PV modules 7-23, ..., 7-2m of string 5-2 to be bypassed so that only PV modules 7-21 and 7-22 contribute to current output for string 5-2. Consequently string 5-2 is "mismatched" relative to the other, normally functioning strings. The accumulation of faults such as F1 causes a reduction in the output of the solar array 3 and thus of the overall assembly 1.

Since PV assembly 1 may have hundreds or even thousands of PV modules, faults such as F1 may go undetected until the operation of the PV assembly 1 has been substantially compromised.

It would be advantageous if a method were provided for identifying one or more strings of a PV array that have become subject to a fault.

SUMMARY OF THE INVENTION

According to a first aspect of the present invention there is provided a method for detecting a fault affecting one or more strings of a plurality of strings each comprised of a number of PV solar modules in series, the method comprising:
determining a representative string current for currents of the plurality of strings; and
deeming one or more strings having currents that are outliers to the representative string current by more than a threshold value to be subject to a fault.

In an embodiment the method includes applying sensor assemblies to each of the strings for measuring respective currents therethrough.

In an embodiment the method includes receiving a measurement signal from each of the sensor assemblies across an electronic data network.

In an embodiment the method includes operating a computer to issue an alarm to a computational device of an operator upon deeming the one or more strings to be subject to a fault.

Preferably the representative string current comprises a mean $\bar{I}_a$ of the currents of all of the strings and the plurality of strings comprise strings $I_1, \ldots, I_n$ and the string current through the $i^{th}$ string is i and the sum of string currents $I_a$ of the currents of the plurality of strings is:

$$I_a = \sum_{i=1}^{n} I_i$$

and the mean current for each string of the array is:

$$\bar{I}_a = \frac{I_a}{n}$$

Alternatively, the representative string current may comprise a value other than the average string current, for example, it may comprise a mid-range value of string currents of the plurality of strings.

Preferably the deeming of the one or more strings having currents that are outliers to the representative string current by more than a threshold value to be subject to a fault includes determining, for each string current a residual $r_1 \ldots r_n$ where:

$$r_i = |I_i - \bar{I}_a|, \forall i = [1,n]$$

The method preferably includes deeming an intra-string fault to be present in the $i^{th}$ string according to:

$$|r_i| < \varepsilon_{Th} \Rightarrow \text{No fault}$$

$$|r_i| < \varepsilon_{Th} \Rightarrow \text{Fault present in the } i^{th} \text{ string}$$

where $\varepsilon_{Th}$ is the threshold value.

In a preferred embodiment of the present invention the method includes deeming a cross string-fault to be present between $i^{th}$ and $j^{th}$ strings according to:

$$\exists i,j \in [1,n] r_i > \varepsilon_{Th} \text{ and } r_j < \varepsilon_{Th}$$

where, $r_i = |I_i - \bar{I}_a|$ and $r_j = |I_j - \bar{I}_a|$ where $\varepsilon_{Th}$ is the threshold value.

Preferably the threshold value is determined by measuring currents through each string in relation to a representative string current for currents of the plurality of strings when all of the strings are in a no-fault condition.

In a preferred embodiment of the present invention the method includes estimating the threshold value according to:

$$\varepsilon_{Th} = \sup \|r_i\|_2,$$

$$\forall i \in [1,n]$$

whilst all of the strings are in a no-fault condition and wherein 'sup' represents the supremum and $\varepsilon_{Th}$ is the greatest lower bound on the norm bounded values of string current residuals.

Preferably the method includes monitoring a current through each string to determine the representative string current.

The method preferably includes identifying a fault location in terms of a number of PV modules along a string that is deemed to be subject to a fault.

It is preferred that the method includes identifying the fault location as a function of current through the string that is subject to the fault and of solar irradiance upon the PV modules.

Where the fault is identified to be a cross-string fault and the method preferably involves initially identifying the fault location on a first one of the cross-string fault affected strings and then using that fault location to find a fault location on the second of the cross-string fault affected strings.

Preferably the method includes generating the function by modelling an array for a plurality of faults. The function may be stored as a look up table.

According to a further embodiment of the present invention there is provided a fault detection assembly for a PV solar generation assembly comprised of an array of PV modules including a plurality of series PV module strings connected in parallel, the fault detection assembly including:
   a plurality of current sensors arranged to monitor respective string currents of said strings;
   a processing arrangement in communication with the current sensors for receiving values of the string currents therefrom;
   a memory device accessible to the processing arrangement containing instructions for execution by the processing arrangement including instructions for:
     determining a representative string current for currents of the plurality of strings;
     deeming one or more strings having currents that are outliers to the representative string current by more than a threshold value to be subject to a fault; and
     issuing an alarm including an identification of the one or more strings deemed to be subject to the fault.

Preferably the memory device further includes instructions for the processing arrangement to determine one or more fault locations for the one or more strings deemed to be subject to the fault.

In a preferred embodiment of the invention the memory device further includes instructions for identifying the one or more fault locations as a function of current through one or more strings that are subject to the fault and of solar irradiance upon the PV modules.

According to another aspect of the present invention there is provided a PV solar generation assembly including:
   an array of PV modules including a plurality of series PV module strings connected in parallel;
   a plurality of current sensors arranged to monitor 10 respective string currents of said strings;
   a processing arrangement in communication with the current sensors and arranged to detect intra-string faults and/or cross-string faults based upon one or two of the string currents exceeding a threshold value.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

Referring now to FIG. 3, there is shown a fault detection assembly 4 according to a preferred embodiment of the present invention that comprises a plurality of sensor assemblies 19-1, . . . , 19-n such as current meters that each generate a measurement signal that in the presently described embodiment of the invention is conveyed to data network 21 and thence to a server 23.

Server 23 is programmed by computer program 27 to log the measurement signals in database 25 and processes them according to instructions stored in a computer program 27 for detecting faults in a manner that will be described. In other embodiments of the invention method that is described herein may be implemented on a microcontroller, programmable logic controller or other suitable processing platform.

Figure 3:
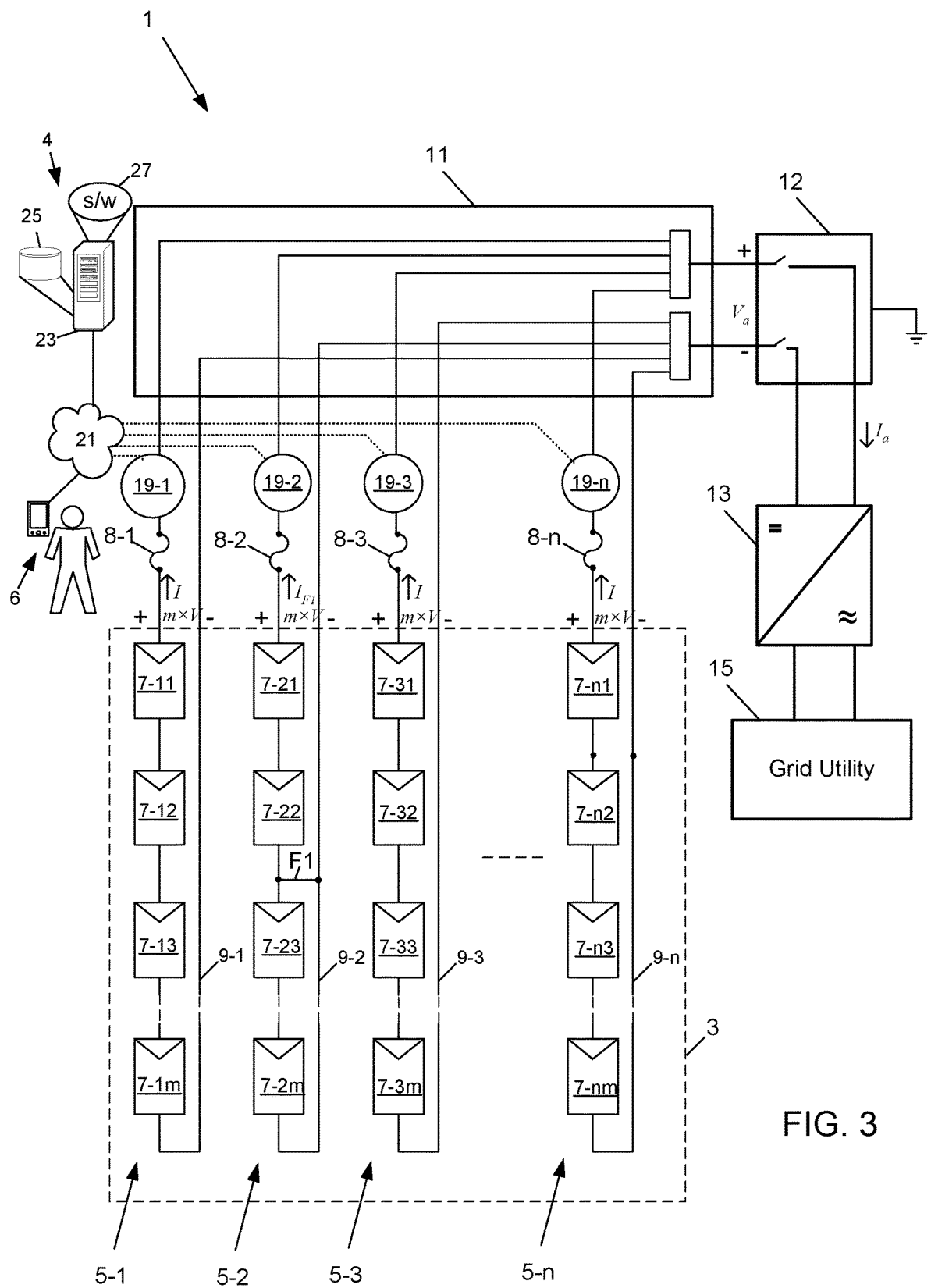
FIG. 3 is a block diagram of a fault detection assembly according to a preferred embodiment of the invention shown in use and connected to the PV electricity generation assembly of FIG. 2.
Figure 3A:
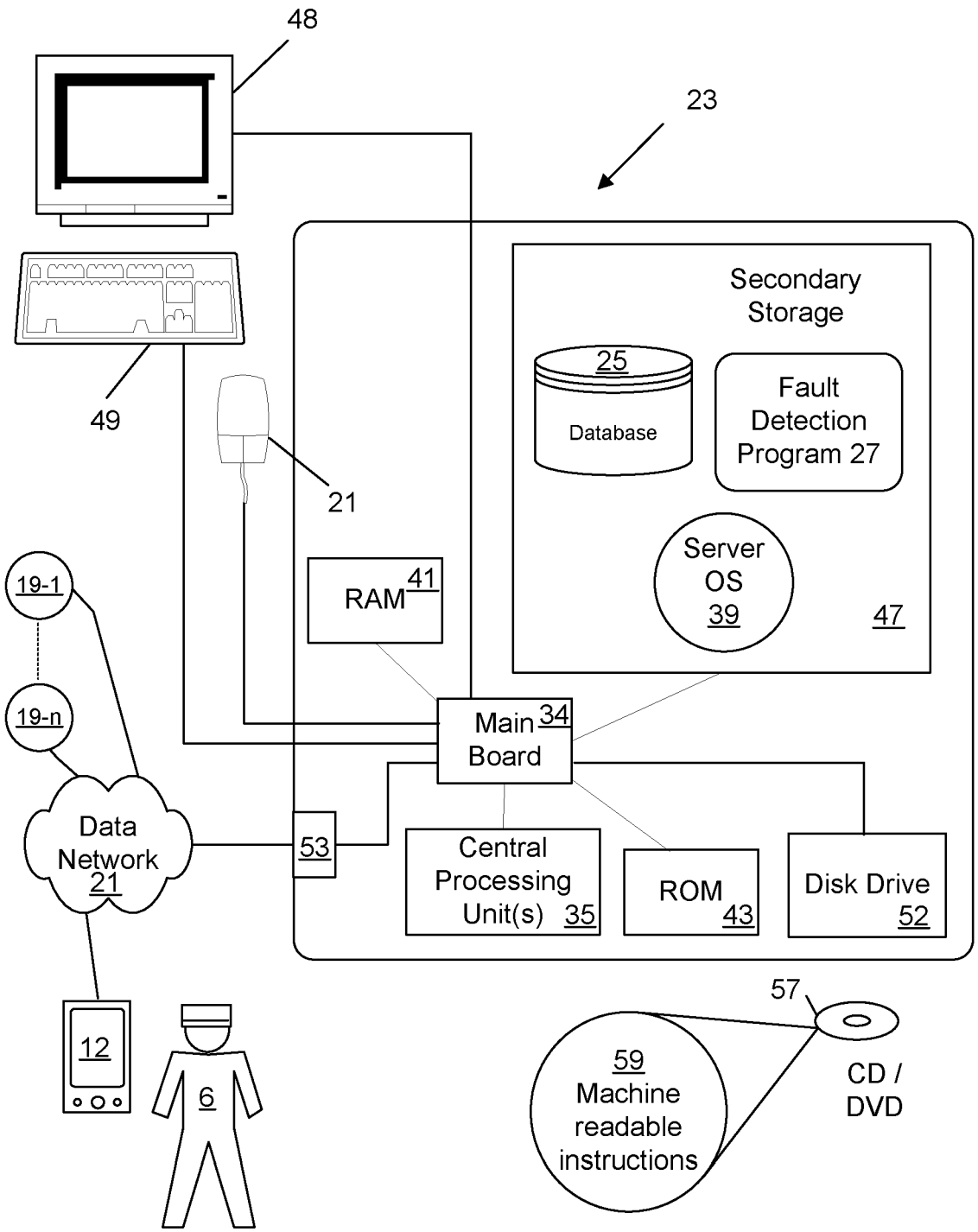
FIG. 3A is a block diagram of a server of the fault detection assembly of FIG. 3.

FIG. 3A comprises a block diagram of the server 23 which is specially programmed with fault detection software product 27 to enable the server to undertake its various tasks as described herein so that a unique hardware and software combination is provided. The server 23 includes a memory device in the form of secondary storage 47, which is typically implemented by a magnetic or solid state data drive and which stores a server operating system, for example Microsoft Windows Server and Ubuntu Linux Server are two examples of such an operating system.

The server 23 includes a main board 34 which includes circuitry for powering and interfacing to at least one processing arrangement in the form of at least one onboard central processing unit or "processor" or "microprocessor" 35. The at least one onboard processor 35 may comprise two or more discrete processors or processors with multiple processing cores.

The main board 34 acts as an interface between CPUs 35 and secondary memory 47. The main board 34 also communicates with random access memory device (RAM) 41 and read only memory (ROM) 43. The ROM 43 typically stores instructions for a Basic Input Output System (BIOS) which the CPUs 35 access upon start up and which prepares the CPUs 35 for loading of the operating system 39 from secondary memory 47.

The main board 34 will typically include a communications adapter, for example a LAN adaptor 53 that places the server 23 in data communication with a computer network such as the Internet 21 via a router or other suitable network interface device.

The server 23 may include a human-to-machine interface (HMI) in the form of keyboard 49, mouse 21 and display 48 which enables administrator 6 to directly enter commands, read output, and generally interact with the server as the CPUs 35 execute various operating system and application software instructions. Alternatively, and more commonly, the administrator logs into the server 23 remotely over the Internet 21 or another data network and performs administrative tasks remotely using a local terminal 12 as the HMI.

The secondary storage 47 also stores the database 25 that is implemented by the fault detection program 27. During operation of the server 23 the server processor assembly 35 loads the operating system 39 and then loads the fault detection program 27.

It will be realised that the exemplary computer server 23 that is illustrated in FIG. 3A comprises a discrete hardware machine that is suitably programmed. In other embodiments of the invention the server may be implemented by a virtual machine, e.g. a "cloud server" that uses shared hardware resources of a "server farm" as required. String current measurement data from sensor assemblies 19-1, . . . , 19-n may be transferred through a fibre optic cable from to a control centre which, using a dedicated communication port then streams the string current data to a cloud server that implements computer server 23 with high power computing capability.

As will be explained, in a preferred embodiment of the present invention the fault detection assembly is able to detect intra-string faults and also cross-string faults and is also able to determine locations of the faults along the fault-affected strings.

The server 23 is able to transmit the identity of the affected string or strings and fault location information across the network 21 to alert administrator 6 by means of the administrator's networked device 23.

The value of the string current measured by each of the meters 19 is denoted as $I_i$, $i \in [1,n]$, where subscript 'i' refers to the $i^{th}$ string measurement. The array current and voltage are written as $I_a$ and $V_a$, respectively and indicated in FIG. 3 for example.

Figure 4:
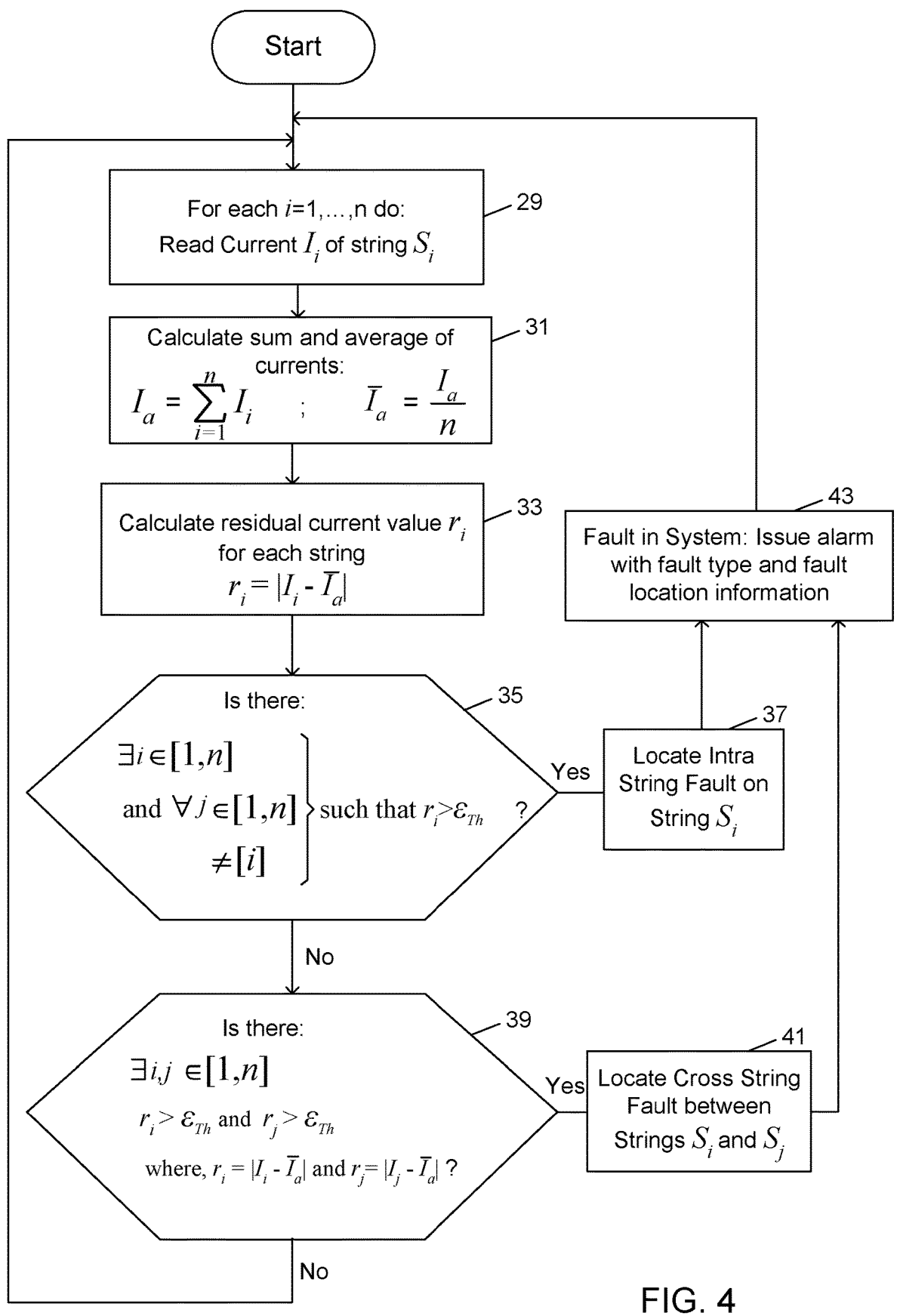
FIG. 4 is a flowchart of a method according to a preferred embodiment of the present invention.

FIG. 4 is a block diagram of a flowchart of a method according to a preferred embodiment of the present invention. The computer program 27 comprises machine readable instructions, which may be stored as non-transitory tangible instructions 59 on a magnetic 47 or optical drive 57 for example for reading by disk drive 52, for the server 23 to perform the method.

At box 29 the server 23 receives measurements from sensors 19-1, . . . , 19-n of each of the string currents 1, . . . , n for each of the strings 5-1, . . . , 5-n.

At box 31 the server 23 calculates the array current which is the sum of the string currents:

$$I_a = \Sigma_{i=1}^{n} I_i$$

and then calculates a representative string current in the form of a mean current for each string of the array, which is:

$$\bar{I}_a = \frac{I_a}{n}$$

However, in other embodiments of the invention the representative string current may comprise another quantity other than the mean value, such as a mid-range value of string currents of the plurality of strings for example.

The server 23 deems a string having a current that is an outlier to the representative string current by more than a threshold value to be subject to a fault. The server performs that step at box 33 by calculating, for each string current a residual $r_i, \ldots, r_n$ where:

$$r_i = |I_i - \bar{I}_a|, \forall i = [1,n]$$

At decision box 35 the server 23 deems an intra-string fault to be present or absent in the $i^{th}$ string of strings 5-1, ..., 5-n according to:

$$|r_i| < \varepsilon_T \Rightarrow \text{No fault}$$

$$|r_i| > \varepsilon_{Th} \Rightarrow \text{Fault present in the } i^{th} \text{ string}$$

Where $\varepsilon_{Th}$ is the threshold value and where the value of i is unique so that there is only one string that has a single residual value that has a magnitude greater than the threshold value.

If at decision box 35, the intra-string fault condition is satisfied then control diverts to box 37 where procedures that will be discussed are performed by server 23 locate the position of the intra-string fault. The server 23, which is under control of software 27, then issues an alarm message at box 43 to the remote device 12 of administrator 6, which includes the fault location details. The administrator 6 can then travel to the fault affected string and attend to rectification of the fault. Alternatively, if the fault condition of box 35 is not satisfied then control diverts to box 39 and a test is performed to see if there are two distinct residuals which are both greater than the threshold value, for two different strings. In that case a cross-string fault is taken to have been identified and control proceeds to box 41 where procedures are implemented to determine the location of the fault on each of the cross-string fault affected strings. The server 23 then issues an alarm at box 43 to the remote device 12 of administrator 6 including the fault location details, i.e. an identification of the points on each of the cross-string fault affected strings between which the cross-string fault lies. The administrator 6 can then travel to the fault affected strings and attend to rectification of the cross-string fault. If the condition for a cross-string fault at box 39 is not satisfied then neither an intra-string fault nor a cross-string fault has been identified and so control diverts back to box 29 to repeat the monitoring process.

The method that has been described makes reference to a threshold value $\varepsilon_{th}$ against which the residuals $r_i$ are tested. The threshold value is determined based on measuring currents through each string in relation to a representative string current for currents of the plurality of strings when all of the strings are confirmed to be in a no-fault condition.

In the presently described preferred embodiment of the invention the method includes estimating the threshold value according to:

$$\varepsilon_{Th} = \sup \|r_i\|_2,$$

$$\forall i \in [1,n] \quad (1)$$

whilst all of the strings are known to be in a no-fault condition and wherein 'sup' represents the supremum and $\varepsilon_{Th}$ signifies the calculation of the greatest lower bound on the norm bounded values of string current residuals.

Intra-String Fault Location Determination—Box 37 of FIG. 4

The current produced by a string that is affected by an intra-string fault will alter from normal depending on where the fault is located along the string. The higher the fault location, that is the more PV modules 7 in the string 5 that are bypassed due to the fault, the larger the string current magnitude change and thus the greater the value of the residual $r_i$ that is calculated in box 33 of the flowchart of FIG. 4.

Figure 5:
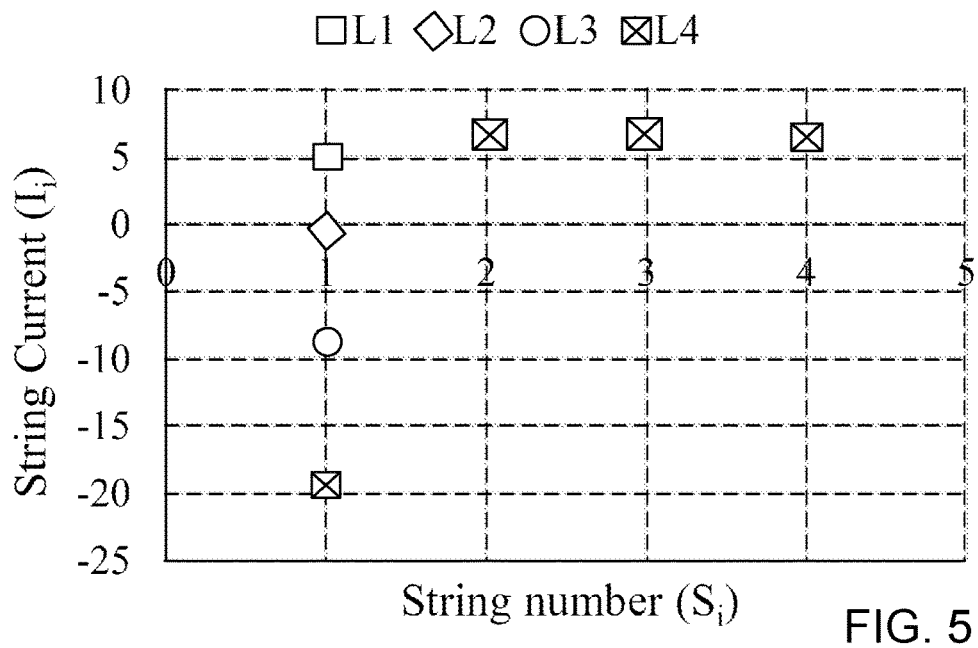
FIG. 5 is a graph of string current versus string number for a 4×4 PV module array showing the effect of a fault at each of four locations along a first string of the array.
Figure 6:
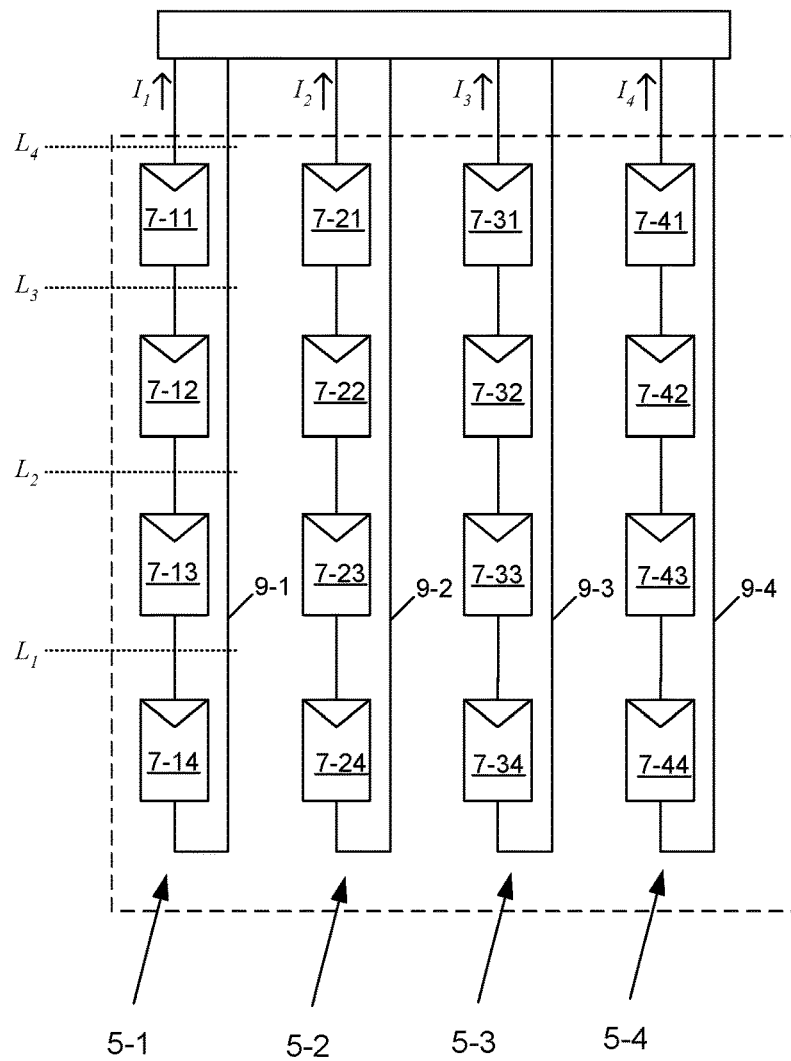
FIG. 6 is a diagram of a solar array corresponding to the graph of FIG. 5.

FIG. 5 is a chart that represents the effect of intra-string faults on the current produced by string 5-1 for each of four fault locations along that string based on the location of the fault ($L_i$: $i \in [1,4]$) in a 4×4 array of solar modules. FIG. 6 illustrates the 4×4 array which is comprised of four parallel strings 5-1, ..., 5-4 each with four series PV modules 7-11, ..., 7-44 and shows the locations $L_1, \ldots, L_4$ at which faults may occur between the series PV modules 7-11, ..., 7-14 of string 5-1 and its return line 9-1.

Since the faulted string, i.e. string 5-1 is connected in parallel with the remaining non-faulted strings 5-2, 5-3 and 5-4, the voltage across string 5-1 is held at the non-faulted voltage $V_a$ and thus the voltage across each of the non-bypassed modules will increase proportionally to maintain the same voltage across all the strings. At the same time the current $I_1$ through the fault-affected string 5-1 is reduced if the fault is at level L1 and becomes increasingly negative as the fault location passes to L2, to L3 and thence to L4 due to backfeed current that flows from the no-fault strings 5-2, ..., 5-4 to faulty string 5-1 to maintain the string voltages equal. Indeed, in the case of a fault at location L4, where all of the modules 7-11, ..., 7-14 are bypassed, then the backfeed current is due to the voltage of the non-faulted strings across a resistance associated with the fault at level L4 and cabling and would be sufficiently great to trigger the open circuit protection device 8-1 (shown for example in FIG. 3).

If a fault condition is detected for a string at box 35 of FIG. 4 then, as previously discussed, at box 37 a fault location procedure is implemented by the server 23 to ascertain the likely location of the occurrence of the intra-string fault along the string. The location of the fault, along with irradiance, number of modules in the string, number of strings in the array and ambient temperature collectively governs the level of fault current ($I_i$) through the faulty string. Consequently the estimated fault location within the $i^{th}$ string can be expressed in functional form as follows:

$$\hat{L}_i = \bar{f}(G, I_i, m, n, T_a) \quad (2)$$

Where $\hat{L}_i$ denotes the estimated fault location within the $i^{th}$ string. For a given PV array the values of m and n are fixed. Furthermore, the temperature ($T_a$) is assumed constant considering it has a weak effect on current, hence on the fault location. Therefore, for a given PV array the expression (2) can be reduced to the following functional form:

$$\hat{L}_i = \bar{f}(G, I_i) \quad (3)$$

It is possible to produce a lookup table or a regression function such that the precise location of a fault within a string can be estimated once the fault has occurred. For the derivation the function set out in Eq. 3, the range of G is taken to be between 400 W/m²-1000 W/m². The choice of this range is practically meaningful for the Inventors because in their working location of Queensland, Australia nearly 75%-90% of the time on a clear sky day the irradiance levels are within 400 W/m²-1000 W/m².

Figure 7:
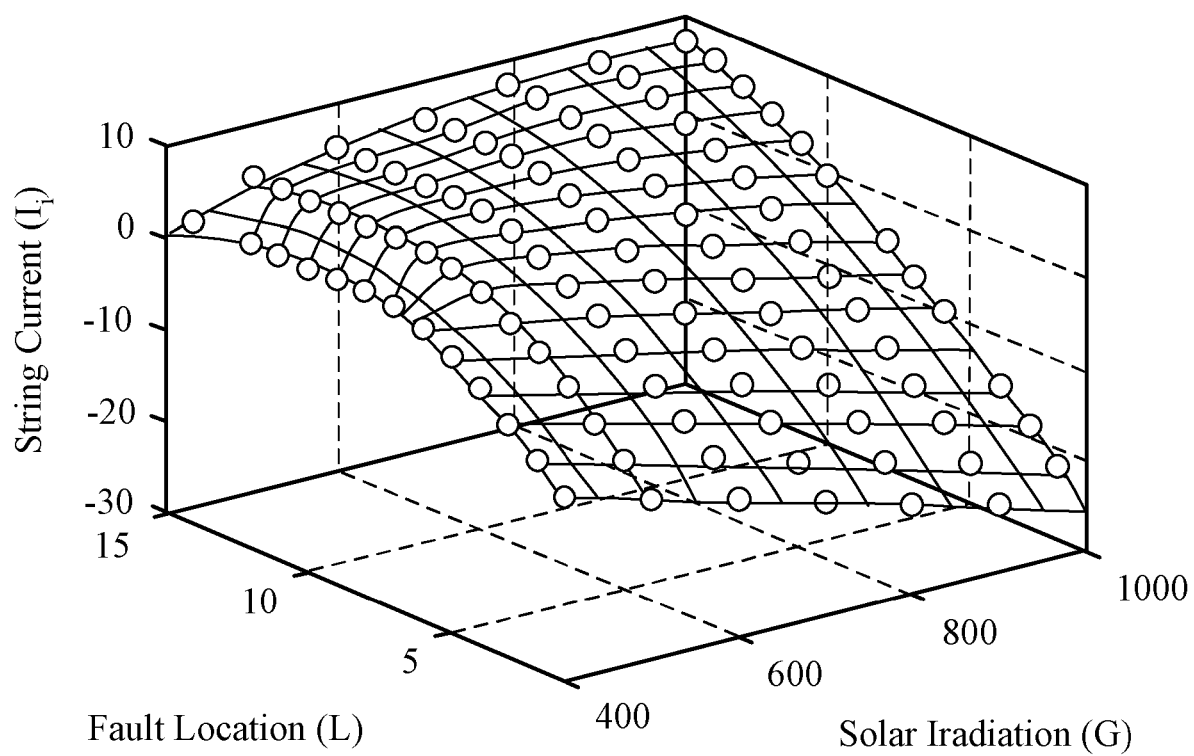
FIG. 7 is a three dimensional graph of a function for determining fault location for each of a number of solar irradiation levels of a 15×4 array of solar PV modules.

In order to obtain a regression function for Eq. 3, which is stored in fault detection software 27, a 3-dimensional data set between $L_i$-$G$-$I_i$ was obtained through a series of simulations performed using a simulation model developed in Matlab Simulink. It will be realised that other approaches to produce the regression function may also be used. Various array configurations were implemented in Simulink including 4×4, 6×3 and 15×4 module arrays. FIG. 7 graphically represents the data set obtained for the 15×4 configuration. The data set was obtained by running simulation sweep for various fault locations (between 1 to 15) and Solar irradiance values (between 400 W/m$^2$-1000 W/m$^2$ in the steps of 100) combinations and the corresponding string (fault) current levels.

In order to obtain a regression function to approximate Eq. (3), the dataset was fitted into a regression model using MATLAB's polynomial surface fit function 26 as described in Marthworks, *Curve fitting Toolbox: User's Guide* (r2017b). 2017: Retrieved Jun. 10, 2017 from: https://www-.mathworks.com/help/pdf_doc/curvefit/curvefit.pdf, to obtain a regression expression in the following form:

$$\hat{L}_i = C_1 + (C_2 \times G) + (C_3 \times I_i) + (C_4 \times G_2) + (C_5 \times G \times I_i) + (C_6 \times I_i^2) - (C_7 \times G^2 \times I_i) + (C_8 \times G \times I_i^2) + (C_9 \times I_i^3) \quad (4)$$

Using the simulation generated dataset, it was possible to estimate the values for parameters ($C_1$ to $C_9$). A cubic fit was selected to estimate coefficients of a polynomial that fits a set of data in a least-squares sense.

For the 15×4 array configuration corresponding to FIG. 7, a cubic fit was found to be the most suitable.

Using the regression expression in Eq. (4), fault location can be calculated at a given irradiance. The fault characteristics show that string currents during 600 W/m$^2$-1000 W/m$^2$ are nearly linear. Most of the time on a clear sunny day the level of irradiance is above 600 W/m$^2$. That can make fault detection more effective and appropriate to avoid false alarms. However, the method of the preferred embodiment can still detect and locate the fault below 600 W/m$^2$ with less accuracy.

In order to gain an insight into string current magnitudes relative to the intra-string line-line faults, a PV array was arranged with four strings with each string having four modules connected in series. Sensor assemblies in the form of current sensors were placed at each string end to analyse the impact of line-line faults on string current magnitudes. For experimentation, random intra-string faults were created by making short circuits at locations $L_1, \ldots, L_4$ in string 5-1 of FIG. 6. For each line-line fault, the corresponding string currents and irradiation were measured. The results obtained from these experiments are summarized in Table 2. The threshold value was calculated using Eq. 1 in a no fault condition at a given irradiance.

TABLE 2

Estimated and actual fault locations with different irradiance.

| G | String Current ($I_1$) | Detection Residual ($r_1$) | $\varepsilon_{Th}$ | $L_{i(actual)}$ | $\hat{L}_{i(estimated)}$ | Accuracy |
|---|---|---|---|---|---|---|
| 700 | 5.10 | 0.325 | 0.3 | 1 | 1.18 | 85% |
| 700 | 1.70 | 3.575 | 0.3 | 2 | 1.80 | 90% |
| 700 | −4.40 | 9.5 | 0.3 | 3 | 2.69 | 90% |
| 700 | −12.7 | 17.35 | 0.3 | 4 | 3.58 | 90% |
| 950 | 1.50 | 5.5 | 0.4 | 1 | 1.12 | 89% |
| 950 | −5.80 | 12.8 | 0.4 | 2 | 2.09 | 95% |
| 950 | −14.1 | 21.1 | 0.4 | 3 | 3.08 | 97% |
| 950 | −24.5 | 31.4 | 0.4 | 4 | 4.05 | 99% |

The results in Table 2 confirm the ability of a method according to an embodiment of the invention to accurately detect and locate intra-string line-line faults. The accuracy in estimating the fault location was 85% or better in all cases. The preferred method according to the present invention is capable of estimating the location with high level of accuracy at different irradiance levels.

The performance of the proposed fault detection and diagnosis method was also analysed in respect of a 6×3 PV array. For experimental fault evaluation, intra-string faults were introduced at various locations within the first string sequentially from location 1 to location 6. The fault detection and location estimation results are set out in Table 3. The threshold was calculated using Eq. 1 and was 0.45 and 0.5 at 750 W/m$^2$ and 800 W/m$^2$ during fault free conditions respectively.

The Inventors' investigations have brought them to the belief that the proposed approach is very useful for detecting and locating faults in different array configurations. The expected fault location can provide the exact fault location after rounding of the $L_i$ values. Also, it is noticeable from the Table 3 that efficiency of estimated fault location increases with an increase in experimental fault location.

TABLE 3

Estimated and actual fault location with different irradiance levels

| G | String Current ($I_1$) | Detection Residual ($r_1$) | $\varepsilon_{Th}$ | $L_{i(actual)}$ | $\hat{L}_{i(estimated)}$ | Accuracy |
|---|---|---|---|---|---|---|
| 750 | 6.5 | 0.4 | 0.45 | 1 | 1.16 | 86% |
| 750 | 5.2 | 0.9 | 0.45 | 2 | 2.49 | 80% |
| 750 | 2.6 | 3.5 | 0.45 | 3 | 2.42 | 81% |
| 750 | −2.7 | 8.8 | 0.45 | 4 | 4.64 | 86% |
| 750 | −4.9 | 11.0 | 0.45 | 5 | 5.40 | 93% |
| 750 | −6.5 | 12.6 | 0.45 | 6 | 6.16 | 97% |
| 800 | 6.7 | 0.67 | 0.5 | 1 | 1.14 | 88% |
| 800 | 5.2 | 1.13 | 0.5 | 2 | 2.40 | 83% |
| 800 | 2.1 | 4.23 | 0.5 | 3 | 3.37 | 89% |
| 800 | −2.92 | 9.25 | 0.5 | 4 | 4.41 | 91% |
| 800 | −5.47 | 11.8 | 0.5 | 5 | 5.35 | 93% |
| 800 | −6.7 | 12.73 | 0.5 | 6 | 6.14 | 98% |

Using simulations and experiments the Inventors have verified that a method according to an embodiments of the invention detects almost all intra-string faults with high accuracy. The proposed method only requires values for string current and irradiance, which are usually available in PV systems. The string currents during fault have a linear relationship, which makes the proposed method scalable. Therefore, the method is applicable to large scale PV systems.

Due to nonlinear characteristics of a fault current in low irradiation, the preferred embodiment assumes irradiation levels between 700 W/m$^2$-1000 W/m$^2$. However, embodiments can detect faults in low irradiation with lower accuracy. Very low irradiation causes the fault currents to be too small to be readily detectable.

Cross-String Fault Location Determination—Box 41 of FIG. 4

Figure 1:
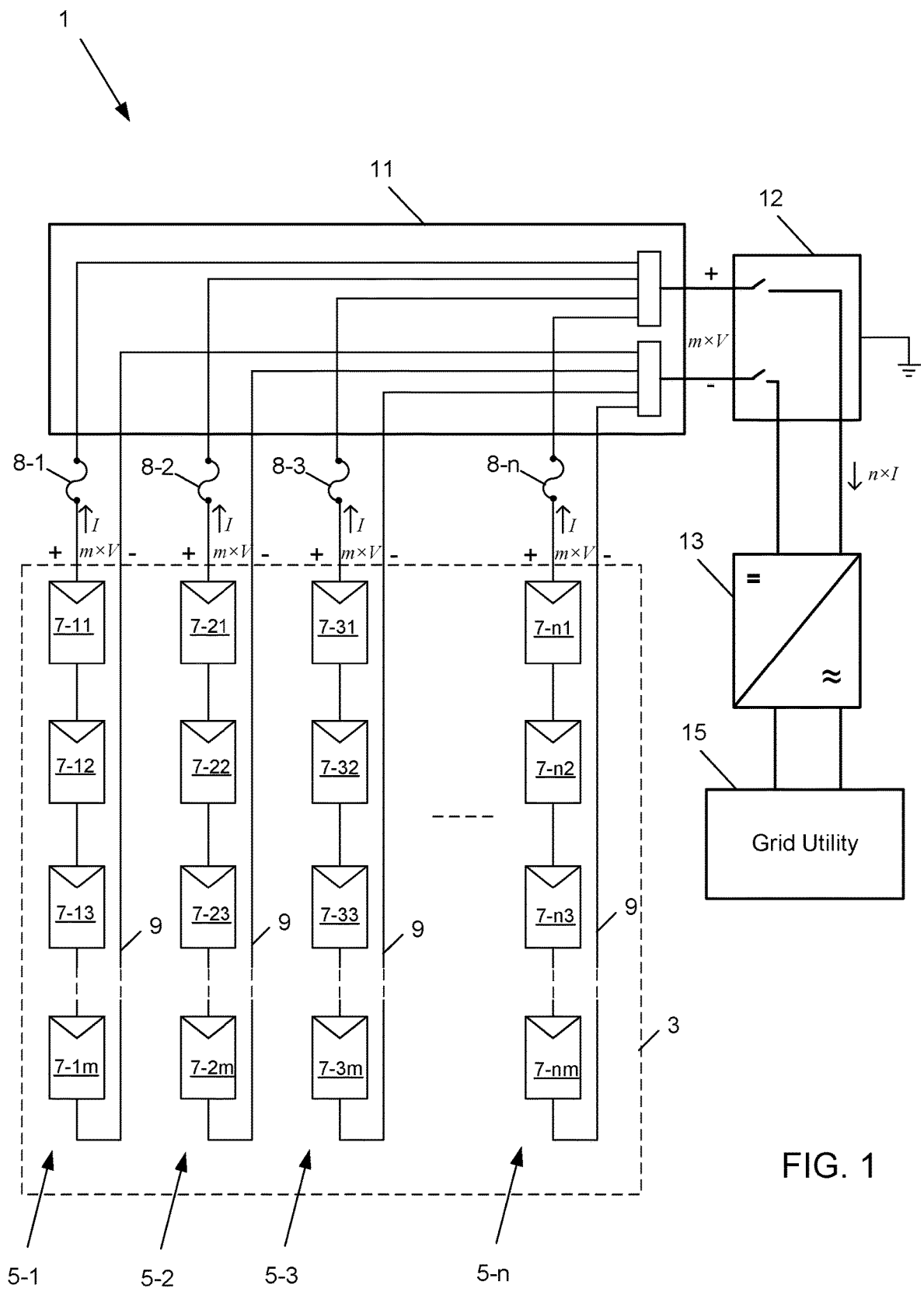
FIG. 1 is a block diagram of a photovoltaic (PV) electricity generation assembly connected to a grid utility.
Figure 2:
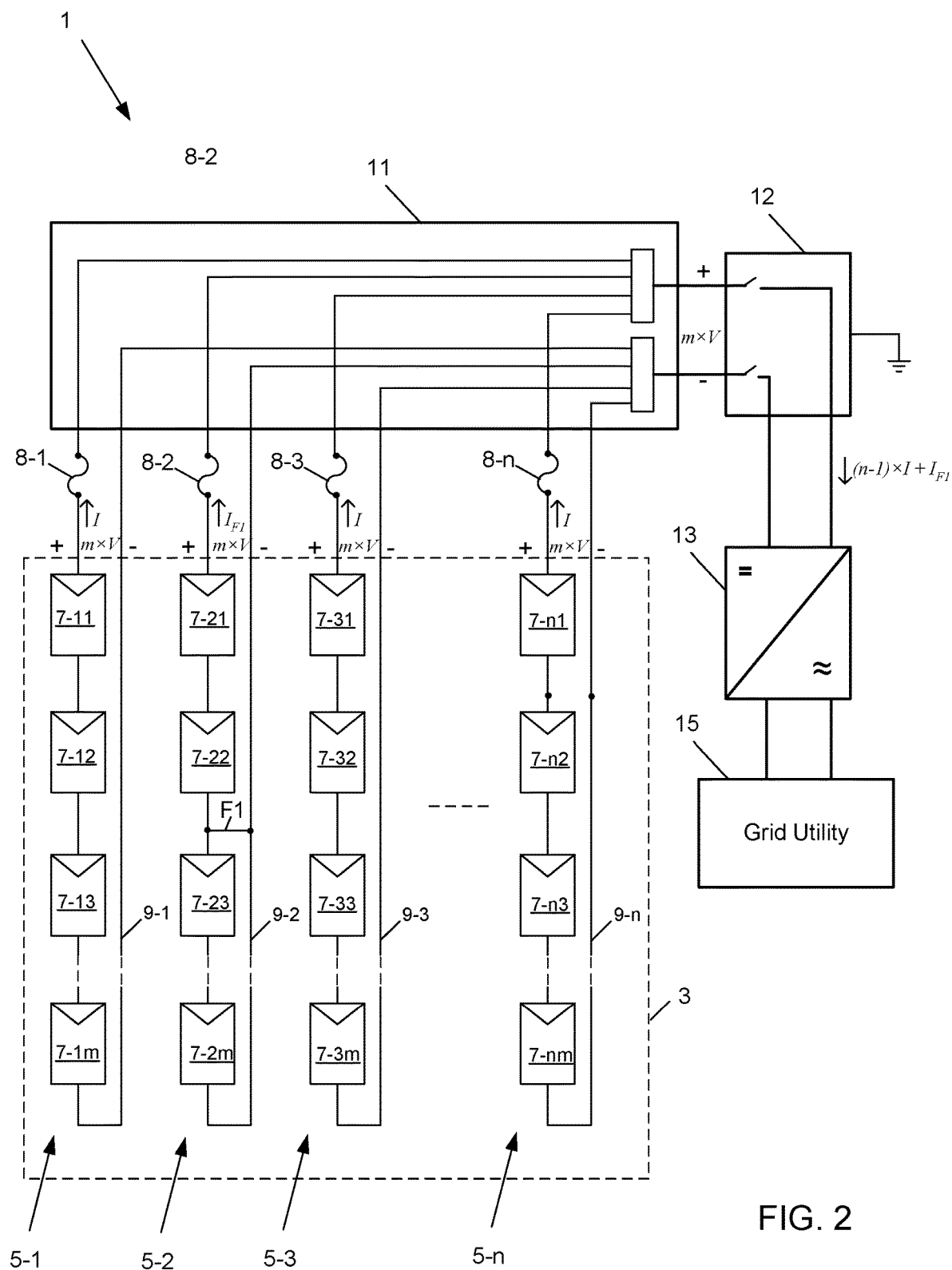
FIG. 2 is a block diagram of the PV electricity generation assembly exhibiting a fault along one of the strings of its array of PV modules.

Thus far the detection of intra-string faults, such as F1 of FIG. 2, has been discussed. Another type of fault that may occur in a solar farm is a cross-string fault. Fault F2, which is illustrated in FIG. 8, is an example of a cross-string fault.

As will be discussed in more detail, once a cross string fault has been identified, as opposed to an intra-string fault, there are two main steps as follows:

1. Delta location is preferably used: that is, the difference between fault locations on the two fault affected strings is determined.
2. Once the delta location, i.e. the difference in fault locations, is established, exact location on each string is determined by determining the fault location on one of the strings by following the same approach as the intra-string faults, and using delta location value to determine location on the second faulty string.

Figure 8:
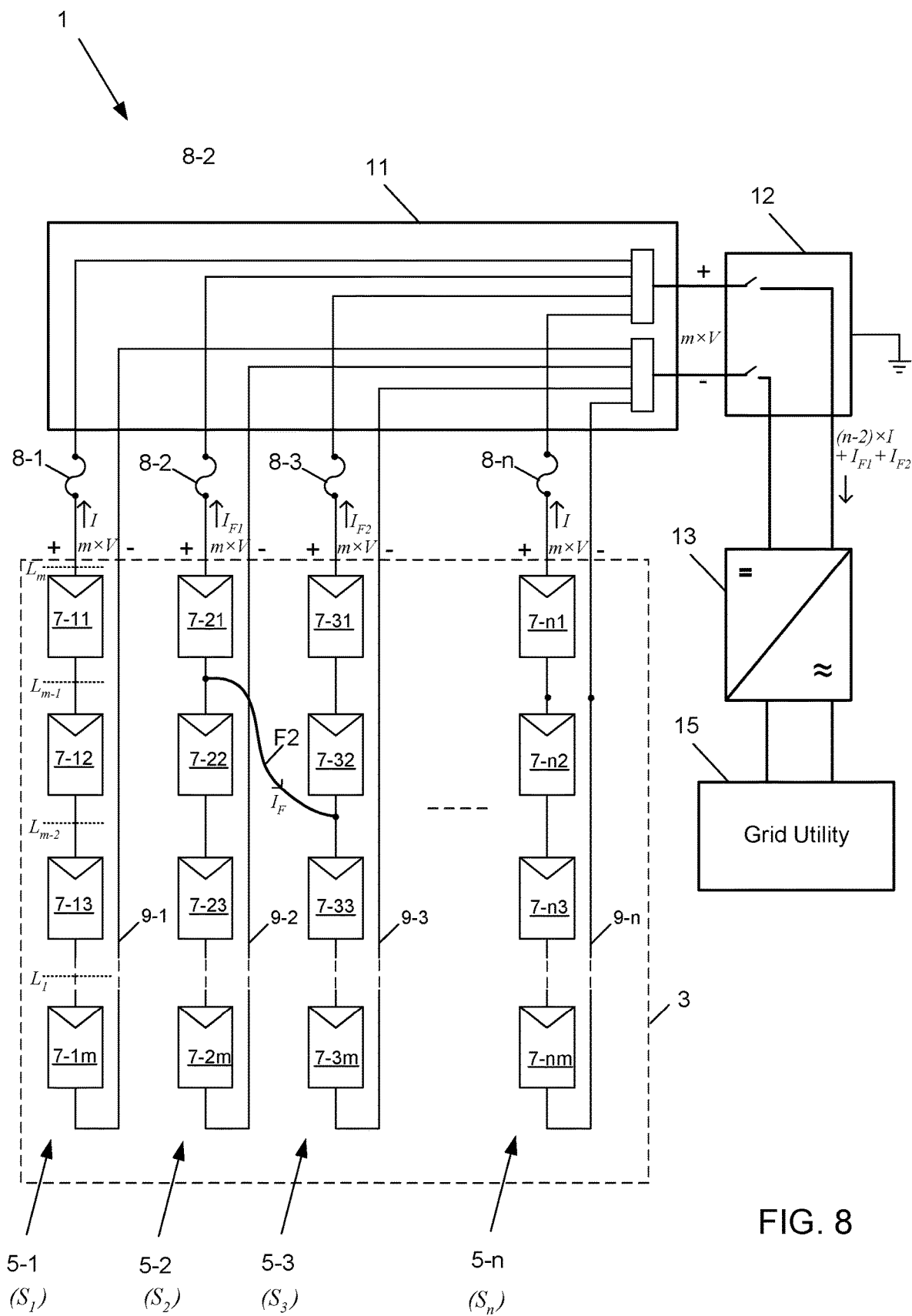
FIG. 8 is a block diagram of a solar array in which a cross-string fault is present.

A cross-string fault such as F2 causes a current (indicated in FIG. 8 as $I_f$ to flow through the fault from the higher potential point ($L_{m-1}$ on string S2) to the lower potential point ($L_{m-1}$ on string S2).

As previously discussed with reference to FIG. 4, the preferred embodiment of the present invention encompasses a fault identification method and apparatus that is able to ascertain whether the fault is within a single string (i.e. an intra-string fault) or between two strings (i.e. a cross-string fault). The proposed fault identification approach is based on the establishment of the number of string current outliers that are detected. A fault that is indicated by the presence of one outlier is deemed to be an intra-string fault (box 35 of FIG. 4) and a fault that is indicated by the presence of two outliers (box 39 of FIG. 4) is deemed to be a cross-string fault.

It will be realised that the residual r; for a given string will depend on string currents affected by potential difference during different line-line faults with the threshold $\varepsilon_{Th}$ calculated based on the array size. Fault identification is established on the satisfaction of following two conditions:

1) If only one of the strings exhibits a residual that is greater than the threshold value then an intra-string fault is present. This condition is reflected in box 35 of FIG. 4.
2) If two strings are exhibiting residuals that are respectively greater than the threshold value then a cross string fault is present. This condition is reflected in box 39 of FIG. 4.

Mathematically the above two conditions can be represented as the conditions that are set out in boxes 35 and 39 and which are:

Condition 1:

$$\exists\, i \in [1, n] \text{ such that } \forall\, j \in [1, n]$$

$$r_i \text{ or } r_j \leq \varepsilon_{Th}$$

$$\text{where, } j \neq i$$

. . . Intra-string fault

Condition 2:

$$\exists\, i, j \in [1, n]\ r_i > \varepsilon_{Th} \text{ and } r_j > \varepsilon_{Th}$$

$$\text{where, } r_i = |I_i - \bar{I}_n| \text{ and } r_j = |I_j - \bar{I}_n|$$

. . . Cross-string fault

It will therefore be realised that as previously alluded to, an intra-string fault is expected to result in one outlier, i.e. one string exhibiting $r_i > \varepsilon_{Th}$ while a cross string fault is likely to result in two outliers i.e. $r_i > \varepsilon_{Th}$, and $r_j > \varepsilon_{Th}$ for two different strings $S_i$ and $S_j$. In intra-string faults, only one string can be affected by lowering and/or reversing the direction of the string current while the currents of the remaining strings remain normal. On the other hand, in cross-string line-line faults, the fault affected strings experience a current variation based on the number of PV modules that are effectively switched from one string to the other due to the cross-string fault. Based on the number of string outliers which is a function of the fault-affected currents, a fault can be identified as intra-string (a single outlier) or a cross-string (two outlier) fault.

Figure 9:
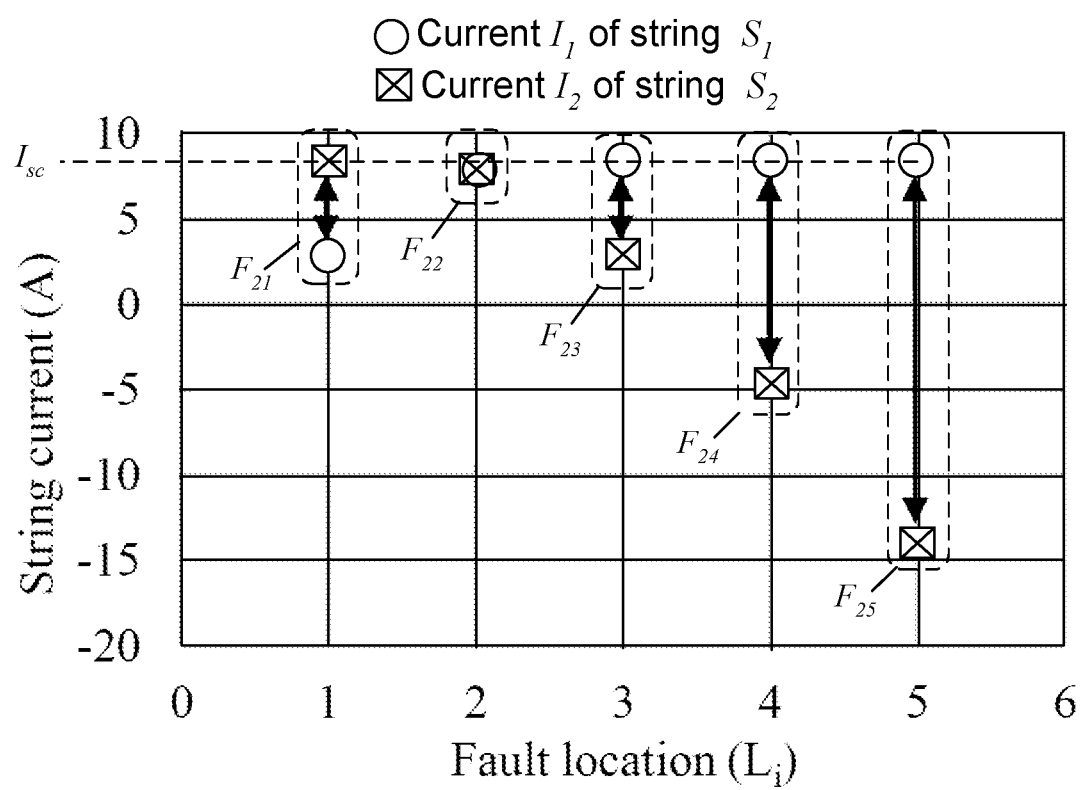
FIG. 9 is a chart illustrating the effect of a cross-string fault between two strings on string current for five different locations of the fault.

In cross-string line-line faults, two strings are typically affected and the current out of each string increases, decreases and/or reverses in direction from normal based on the fault locations at either end of the cross-string fault. FIG. 9 is a chart that shows the variation in string current $I_1$ and $I_2$ for two strings $S_1$, $S_2$ for each of five different cross-string faults, $F_{21}$, $F_{22}$, $F_{23}$, $F_{24}$ and $F_{25}$ which are respectively illustrated in FIGS. 10 to 14.

Figure 10:
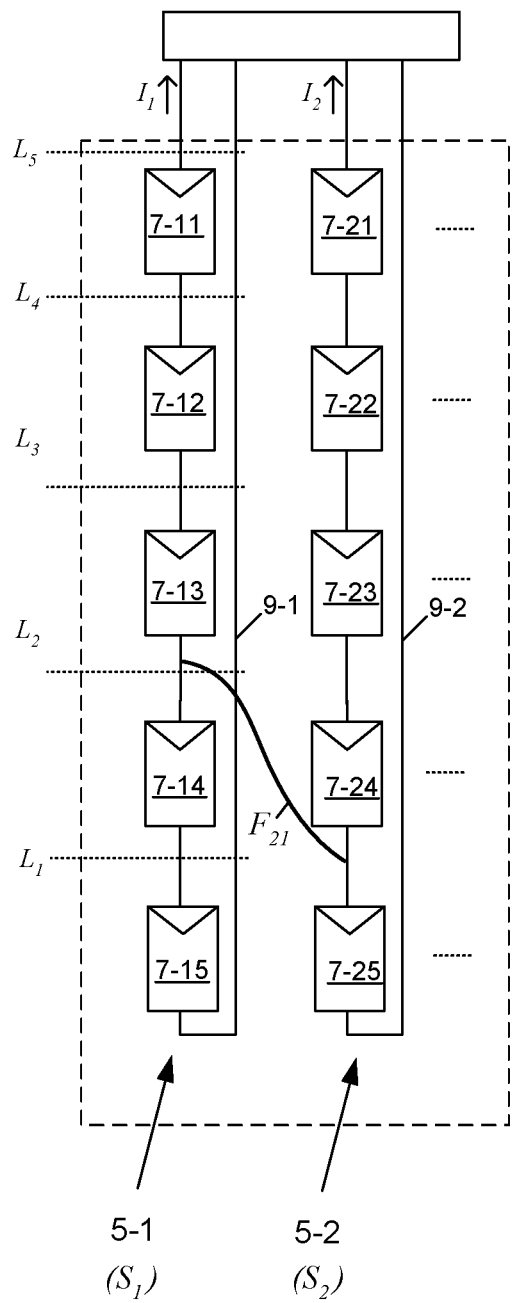
FIG. 10 is a diagram showing the first fault for the chart of FIG. 9.

For example, with reference to FIG. 9, fault $F_{21}$ is between L2 on S1 and L1 on S2 as illustrated in FIG. 10.

Fault $F_{21}$ increases the current $I_2$ out of string $S_2$ and decreases the current $I_1$ out of string $S_1$. This change occurs due to the cross-string fault $F_{21}$ electrically connecting panels 7-14 and 7-15 of $S_1$ to the negative side of PV module 7-24 of $S_2$ so that current from PV modules 7-14 and 7-15 contributes to the current $I_2$ that flows out of string $S_2$. At the same time, the current contributed by PV modules 7-14 and 7-15 to the current $I_1$ out of string $S_1$ is reduced.

Figure 11:
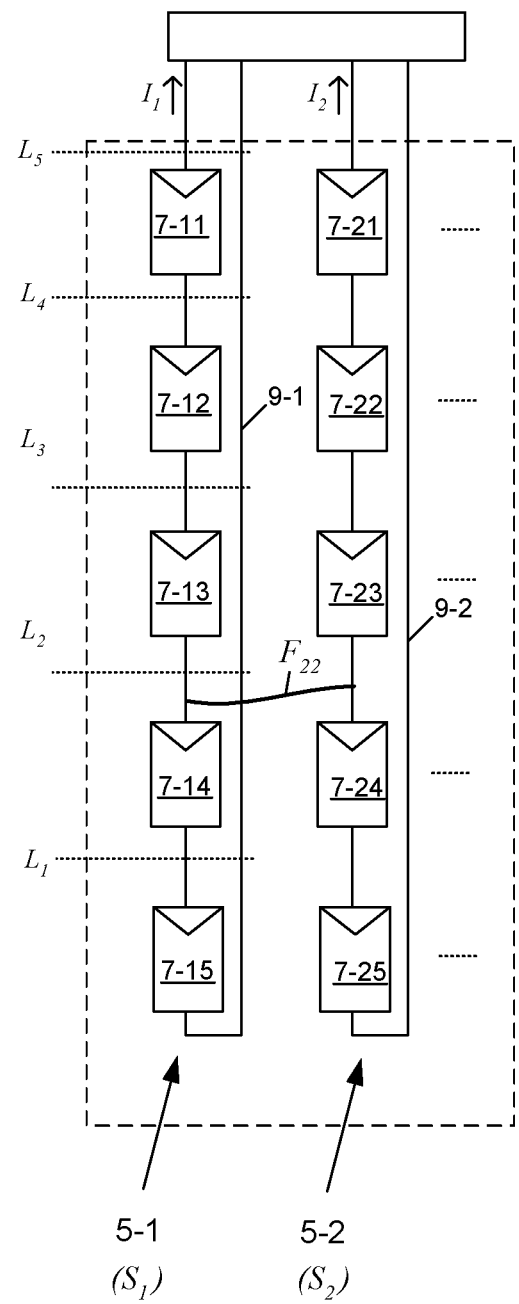
FIG. 11 is a diagram showing the second fault for the chart of FIG. 9.

It will be observed in FIG. 9, that fault $F_{22}$ is between L2 on $S_1$ and L2 on $S_2$ as depicted in FIG. 11. Since fault $F_{22}$ has ends on each string at the same fault location there is no change in current out of either of the two strings as illustrated in FIG. 9.

Figure 12:
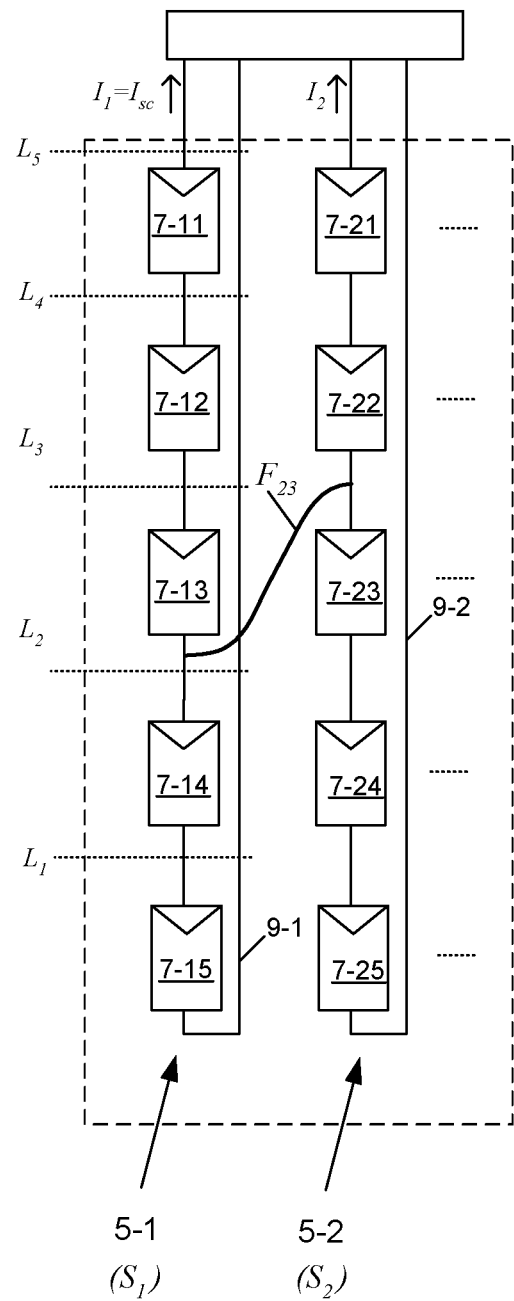
FIG. 12 is a diagram showing the third fault for the chart of FIG. 9.

Fault $F_{23}$, which is illustrated in FIG. 12 slightly increases the current $I_1$ out of string $S_1$ to a saturation current level $I_{sc}$ of about 7 Amps and decreases the current $I_2$ out of string $S_2$. This change occurs due to the cross-string fault $F_{23}$ electrically connecting panels 7-23, 7-24 and 7-25 of $S_2$ to the negative side of PV module 7-13 of $S_1$ so that they contribute to the current $I_1 = I_{sc}$ that flows out of string $S_1$. At the same time, the current contributed by PV modules 7-23, 7-24 and 7-25 to the current $I_2$ out of string $S_2$ is reduced by the mismatching of a further PV module, i.e. PV module 7-23.

Figure 13:
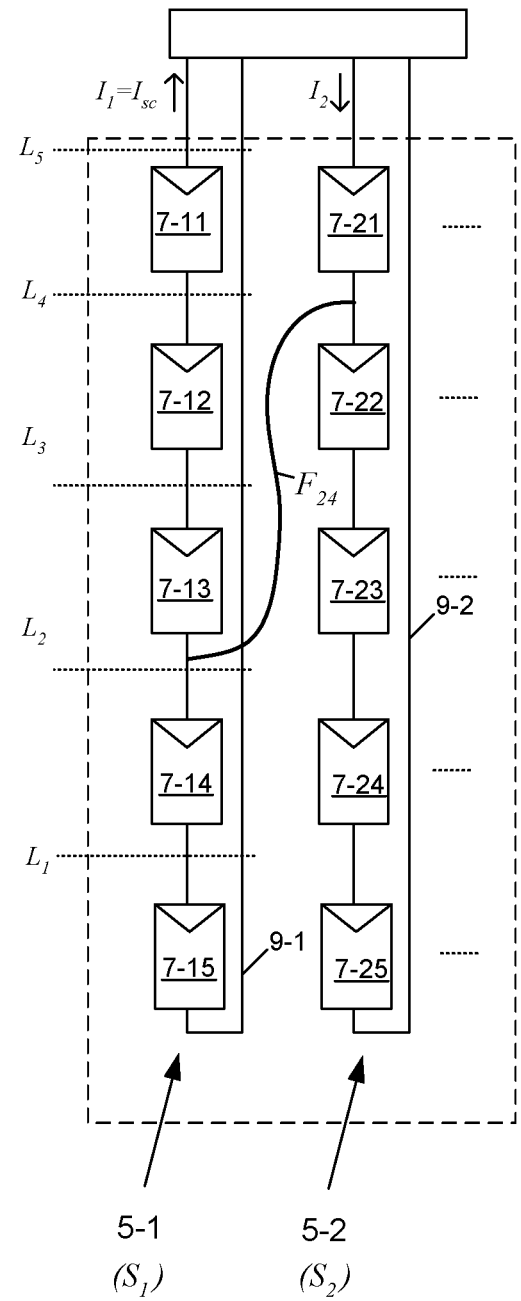
FIG. 13 is a diagram showing the fourth fault for the chart of FIG. 9.

Fault $F_{24}$, which is illustrated in FIG. 13 maintains the current $I_1 = I_{sc}$ out of string $S_1$ at the saturation current level $I_{sc}$ and decreases the current $I_2$ out of string $S_2$. This change occurs due to the cross-string fault $F_{24}$ electrically connecting panels 7-22, 7-23, 7-24 and 7-25 of $S_2$ to the negative side of PV module 7-13 of $S_1$ so that they contribute to the current $I_1 = I_{sc}$ that flows out of string $S_1$. At the same time, the current contributed by PV modules 7-22, 7-23, 7-24 and 7-25 to the current $I_2$ out of string $S_2$ is further reduced by the mismatching of a further PV module, i.e. PV module 7-22.

Figure 14:
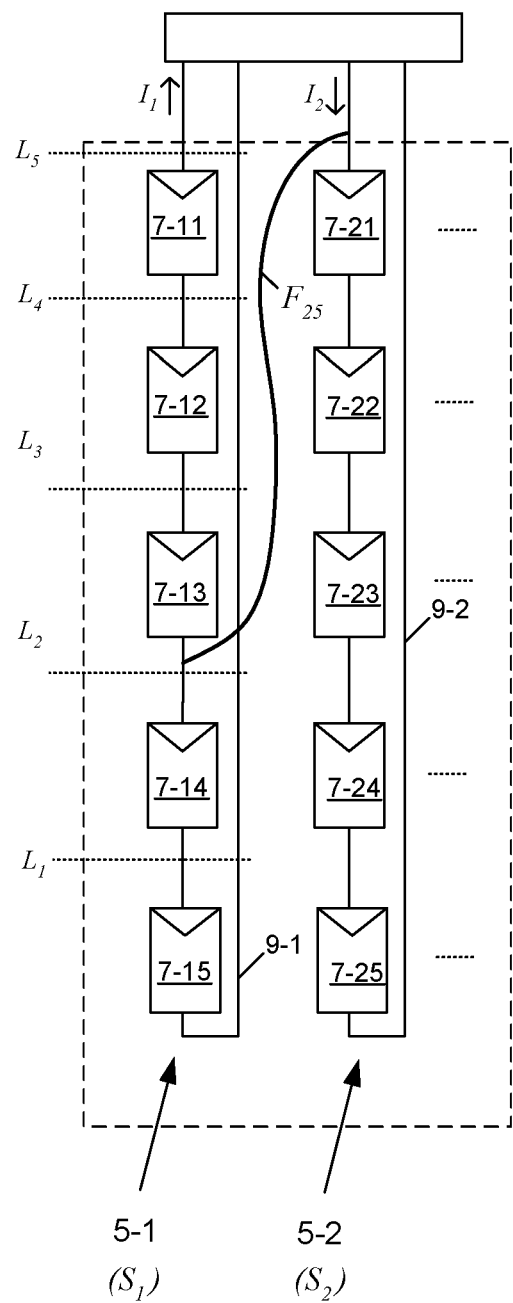
FIG. 14 is a diagram showing the fifth fault for the chart of FIG. 9.

Fault $F_{25}$, which is illustrated in FIG. 14 maintains the current $I_1 = I_{sc}$ out of string $S_1$ at the saturation current level $I_{sc}$ and decreases the current $I_2$ out of string $S_2$. This change occurs due to the cross-string fault $F_{25}$ electrically connecting series panels 7-21, 7-22, 7-23, 7-24 and 7-25 of $S_2$ to the negative side of PV module 7-13 of $S_1$ so that they contribute to the current $I_1 = I_{sc}$ that flows out of string $S_1$. At the same time, the current contributed by PV modules 7-21, 7-22, 7-23, 7-24 and 7-25 to the current $I_2$ out of string $S_2$ is further reduced by the mismatching of a further PV module, i.e. PV module 7-21.

The Inventors have observed that a cross string fault gives rise to the following:

The cross-string fault results in one of the affected strings effectively having a reduced number of modules and the other string having a greater number of modules. For example, the fault F21 in FIG. 10 causes String 1 to gain a PV module 7-25 from string 2 and for string 2 to lose PV module 7-25.

A short circuit between two different locations of the string creates a potential difference between short circuited points. As a result, current flows from higher potential to lower potential.

Since strings are connected in parallel in an array, the voltage across each string is uniformly distributed across all the strings. Consequently all the strings share a common voltage across each of them, no matter how many modules are affected by faulted strings. Therefore, based on the number of modules in a faulted string, the string voltage will be equally shared across each module. As a result, for two strings interconnected by a single cross-string fault, the string with the greater number of modules will have less voltage appear across each module and the string with fewer modules will have more voltage appear across each module.

The points of short circuit with different potentials are referred as a mismatch. The current that flows from one string to the other due to a cross-string fault is related to the mismatch percentage.

Therefore, the string with fewer remaining modules due to the cross-string fault has less current in proportion to the mismatch percentage. On another side, the string contributing more modules will have a comparatively higher current than normal strings connected in parallel.

The string current increases as a string gains more modules due to a cross string fault and the string current will saturate at I/s of the PV module at standard test conditions (STC). This is due to the capacity limit of maximum current that can be produced by the PV module.

From the above observation, the Inventors have realised that the change in faulted string current is proportional to the mismatch percentage (fault locations). Therefore, this relationship can be used to formulate a fault location approach.

In cross-string line-line faults, the difference in current between the fault affected strings is a function of the voltages at the end points of the fault locations, when those voltages are measured prior to the fault occurring.

Particularly, the string associated with one of the outliers will have a larger current than the string associated with the other of the outliers. The string current ($I_i$) changes with fault location ($L_i$) at a given irradiation. From this observation, it is understood that the difference of the fault-affected string currents ($\Delta I$) is proportional to the difference in fault locations ($\Delta L$) given as per Eqs. (5) and (6). The Inventors have conceived that this relationship can be used to formulate a fault location approach according to a preferred embodiment of the present invention, which is implemented by server 23 under control of instructions comprising software product 27.

Fault locations at the $i^{th}$ and $j^{th}$ faulty strings be denoted as $L_i$ and $L_j$. The corresponding current measurements are $I_i$ and $I_j$. Based on the measurements, the relationship established using relative location and current is given by $$\Delta I = I_i - I_j \quad (5)$$

$$\Delta L = L_i - L_j \quad (6)$$

As the fault location between the two strings vary the associated string current varies as well. As a result, if the $\Delta I$ is known, the fault location of one of the strings is estimated and the fault location in the second faulty string can be obtained using the equation (6).

The procedure to calculate cross-string fault location, which is used by software product 27, is discussed with reference to the steps below:

1. Establish a relationship $\Delta L = f (\Delta I)$ between $\Delta L$ and $\Delta I$.

Figure 15:
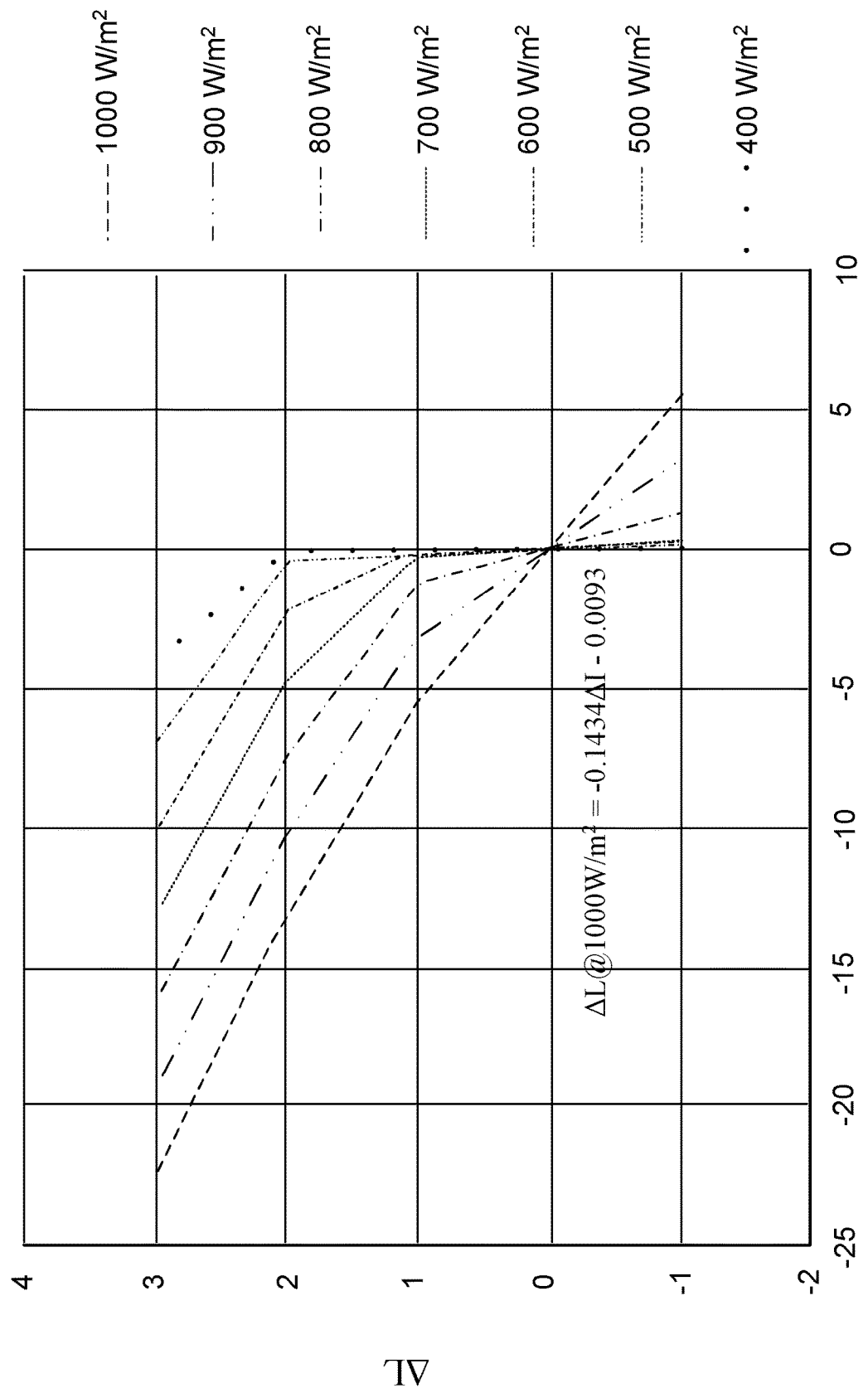
FIG. 15 is a graph relating change in fault location to change in current for cross string faults.
Figure 16A:
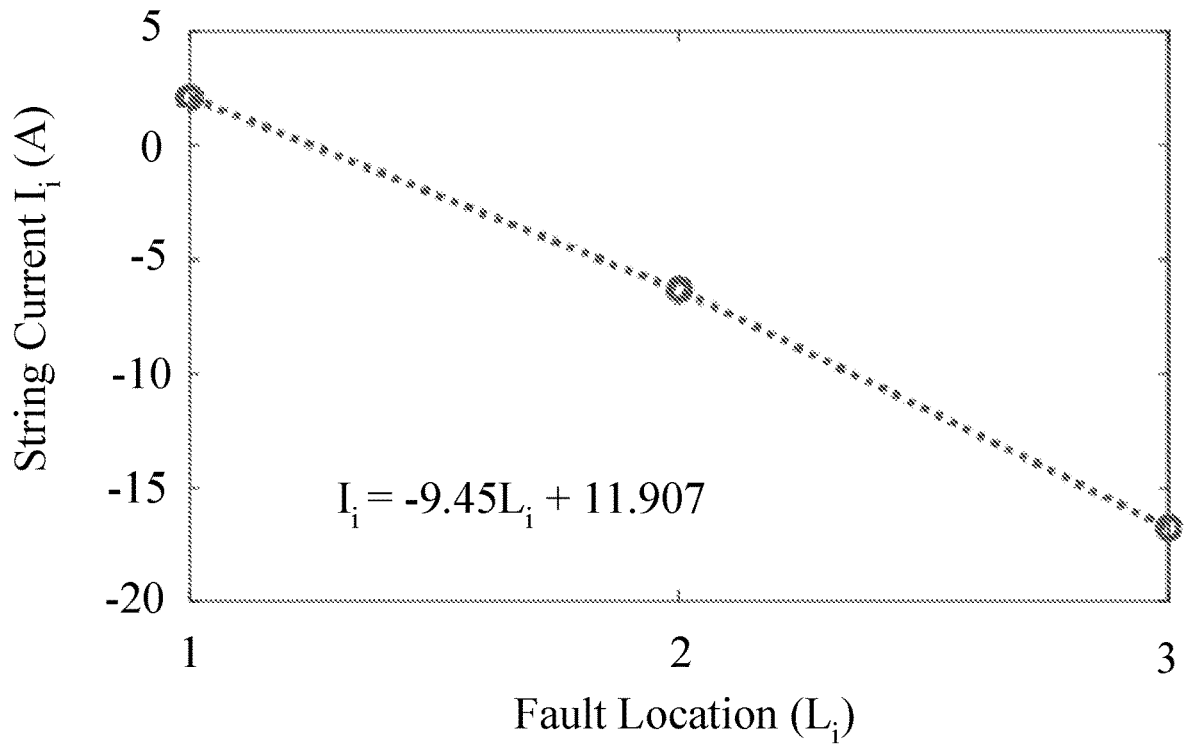
FIG. 16A is a graph indicated fault current magnitudes in a 3×3 array at a 1000 W/m2 irradiance location.
Figure 16B:
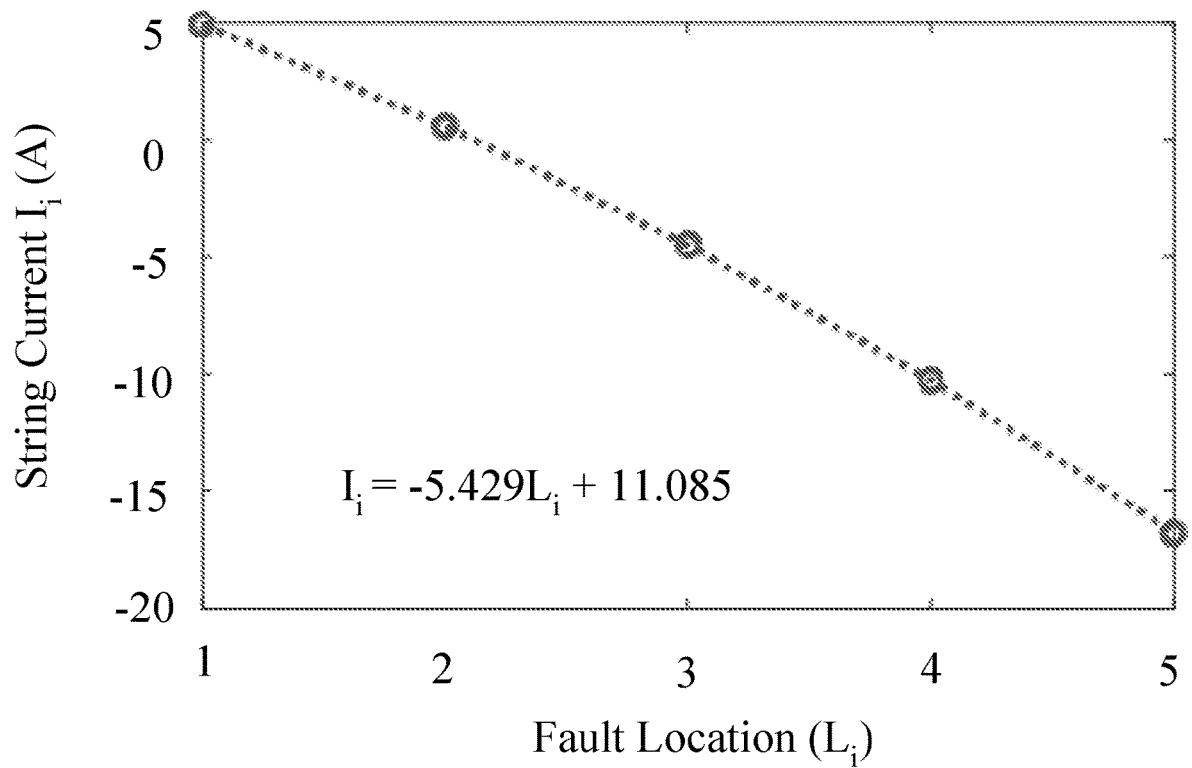
FIG. 16B is a graph indicating fault current magnitudes in a 5×3 array at a 1000 W/m2 irradiance location.
Figure 16C:
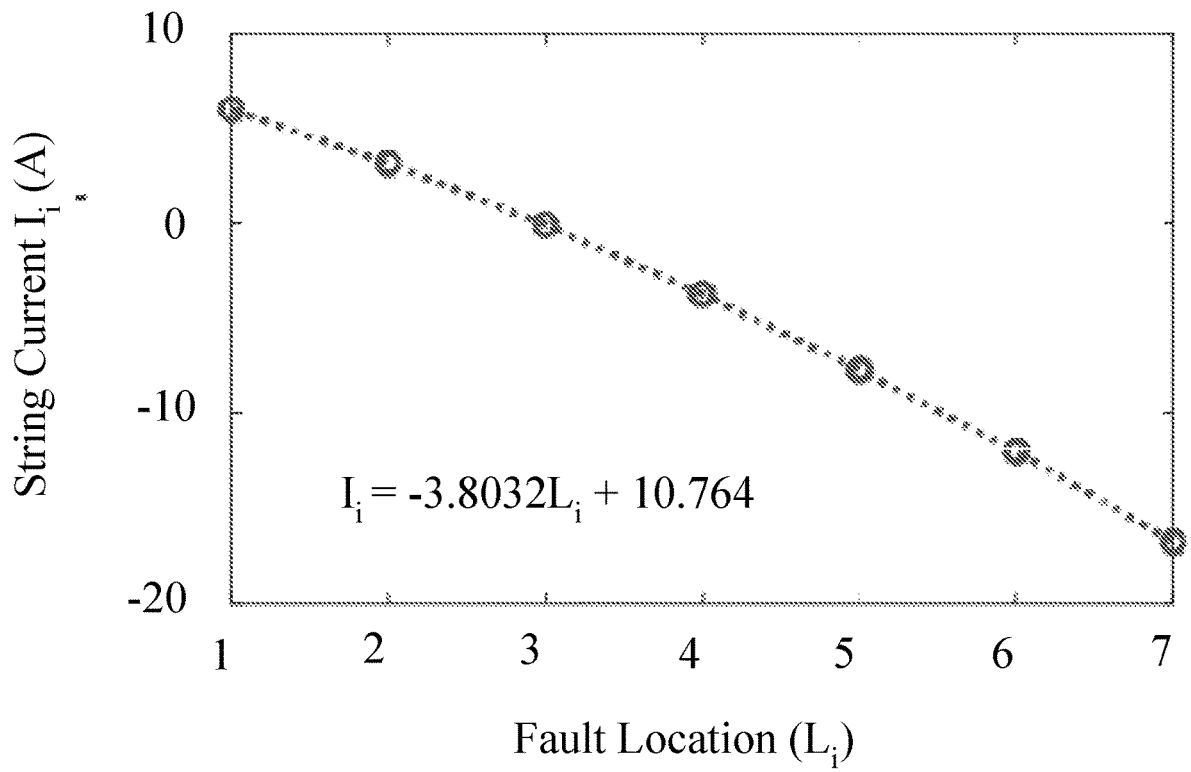
FIG. 16C is a graph indicating fault current magnitudes in a 7×3 array at a 1000 W/m2 irradiance location.
Figure 16D:
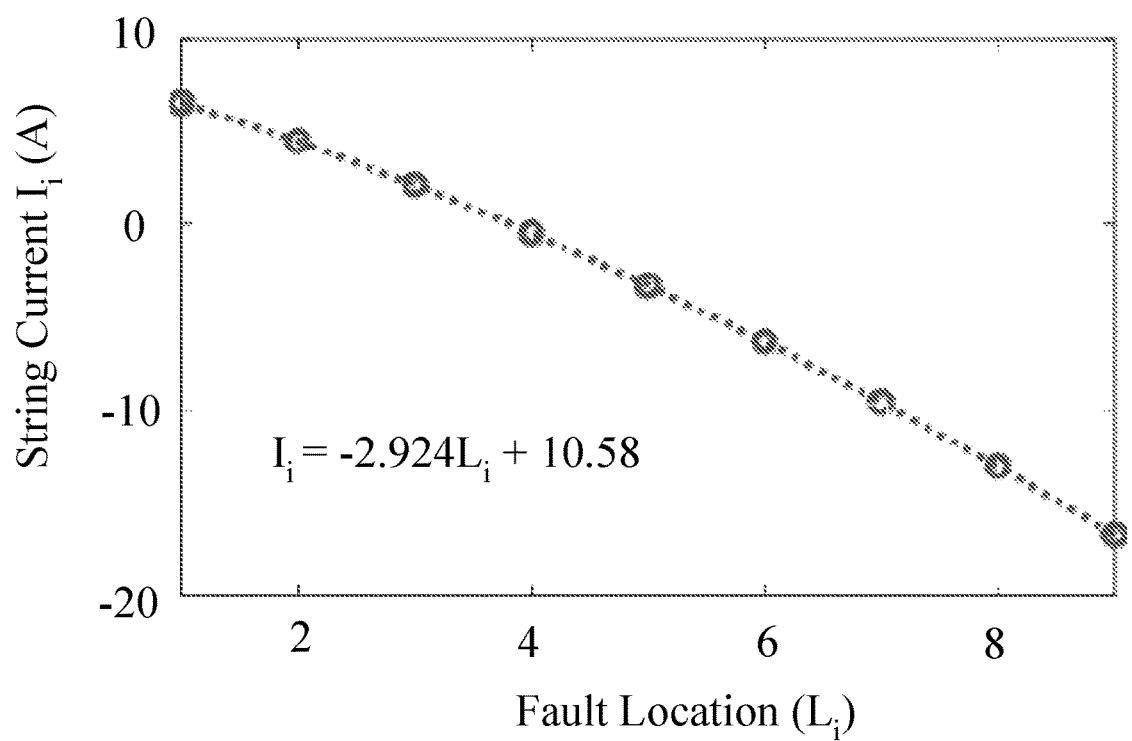
FIG. 16D is a graph indicating fault current magnitudes in a 9×3 array at a 1000 W/m2 irradiance location.

In cross-string fault, one of the outliers has a larger current than others. The string current ($I_i$) changes with fault location ($L_i$) at a given irradiation. From this observation, it is understood that the difference of faulted string current ($\Delta I$) is proportional to the difference in fault locations ($\Delta L$) given as per Eqs. (5) and (6). Therefore, this relationship can be used to formulate the fault location approach. The $\Delta I$ vs $\Delta L$ characteristics are plotted for various combinations in 4×4 array at a given irradiance. FIG. 15 shows $\Delta I$ vs $\Delta L$ characteristics at a number of irradiance levels.

2. Using string current measurements calculate $\Delta L$.

From FIG. 15, it is observed that $\Delta I$ and $\Delta L$ have a nearly linear relationship especially in the irradiance range between 700 W/m² to 1000 W/m². At high irradiance levels, the linear relationship exists regardless of the fault locations. Consequently, if the string currents are known, the module mismatch percentage or number of bypassed modules ($\Delta L$) can be estimated using the following expression, $$\Delta L = m \times \Delta I + b \quad (7)$$

TABLE 4

Estimated values of slope and intercept for FIG. 7

| Irradiation (W/m²) | m | b |
| --- | --- | --- |
| 1000 | −0.1434 | −0.0093 |
| 900 | −0.1713 | −0.0032 |
| 800 | −.20310 | 0.0491 |
| 700 | −0.2415 | 0.1480 |
| 600 | −0.2982 | 0.2779 |
| 500 | −0.3826 | 0.4419 |
| 400 | −0.6379 | 0.4935 |

Table 4 shows estimated values of slope (m) and intercept (b) for plotted lines in FIG. 15 at the respective irradiation. In Eq. (7), the expression is obtained for 4×4 array. A similar expression can be obtained for any array size through $\Delta I$ and $\Delta L$ characteristics.

The expression for the likely location of the fault ($L_i$) in the $i^{th}$ string can be obtained according to Eq. (6). Initially, the Inventors created various cross-string fault combinations using MATLAB/Simulink and generated three dimensional data by following the same procedure that was previously discussed for intrastring faults in relation to FIG. 7. Similar to the procedure that was followed for intra-string fault analysis, a regression expression was derived for use in cross-string fault location detection. By extracting the parameters of the regression function, likelihood location of the fault $\hat{L}_i$, at given irradiance (G) was estimated using string current ($I_i$). Once the location of the fault in the $i^{th}$ string was known, the location of the fault in the $j^{th}$ string could then be estimated using Eq. (7).

Experimental Validation

Validation on a 4×4 Array

For experimentation, random intra-string faults were created by short circuits within string 1. Similarly, arbitrary cross-string line-line faults were created by short circuiting between different points of string 1 and string 2. The faults were created with the irradiation (GHI) levels at the experimental setup location of (i) 700 W/m², (ii) 850 W/m² and (iii) 950 W/m². For each irradiance level, the faults were created, and the corresponding string currents were measured. The residuals for different faults were then calculated. Similarly, a pre-defined threshold at corresponding weather conditions was calculated during a no-fault condition as previously discussed. The results obtained from these experiments are summarised in Table 5.

The results in Table 5 confirm the ability of the proposed approach to accurately detect, identify and locate line-line faults. The experimental results were found to be consistent with the simulation results. The performance in estimating the fault location is particularly noteworthy. Upon rounding of the estimated fault locations to the nearest whole numbers, the estimated fault locations were found to be the true reflection of actual fault locations. Furthermore, the proposed approach is capable of prompt fault detection due to its ability to perform well regardless of the irradiance levels.

TABLE 5

Experimental results of fault detection, identification and location for different irradiance in 4 × 4 array

| GHI (W/m²) | Detection | | | | | Identification | | Location | | |
|---|---|---|---|---|---|---|---|---|---|---|
| | Residual | | | | | No. of | Fault | | | Accuracy |
| | $r_1$ | $r_2$ | $r_3$ | $r_4$ | $\varepsilon_{Th}$ | outliers | type | $L_{x(actual)}$ | $\hat{L}_{x(estimated)}$ | status |
| 700 | 0.32 | 0.22 | 0.21 | 0.22 | 0.3 | 1 | Intra-string | 1 | 1.18 | ✓ |
| 700 | 3.57 | 0.20 | 0.21 | 0.20 | 0.3 | 1 | Intra-string | 2 | 1.80 | ✓ |
| 700 | 9.5 | 0.18 | 0.18 | 0.17 | 0.3 | 1 | Intra-string | 3 | 2.69 | ✓ |
| 700 | 17.3 | 0.18 | 0.17 | 0.17 | 0.3 | 1 | Intra-string | 4 | 3.58 | ✓ |
| 850 | 3.5 | 0.37 | 0.29 | 0.28 | 0.35 | 2 | Cross-string | 1, 3 | 0.82, 2.53 | ✓ |
| 850 | 1.11 | 3.28 | 0.26 | 0.27 | 0.35 | 2 | Cross-string | 1, 2 | 0.8, 1.51 | ✓ |
| 850 | 1.71 | 11.2 | 0.25 | 0.26 | 0.35 | 2 | Cross string | 3, 4 | 2.89, 3.71 | ✓ |
| 850 | 1.82 | 20.3 | 0.25 | 0.25 | 0.35 | 2 | Cross-string | 2, 4 | 2.13, 3.72 | ✓ |
| 950 | 5.5 | 0.29 | 0.28 | 0.29 | 0.4 | 1 | Intra-string | 1 | 1.12 | ✓ |
| 950 | 12.8 | 0.28 | 0.27 | 0.28 | 0.4 | 1 | Intra-string | 2 | 2.09 | ✓ |
| 950 | 21.1 | 0.26 | 0.28 | 0.27 | 0.4 | 1 | Intra-string | 3 | 3.08 | ✓ |
| 950 | 31.5 | 0.27 | 0.26 | 0.26 | 0.4 | 1 | Intra-string | 4 | 4.05 | ✓ |
| Fault location accuracy | | | | | | | | | | 100% |

Fault Verification on 6×3 Array

Experimental validation of the proposed fault detection and diagnosis approach was repeated on a 6×3 PV array. For validating the approach, random line-line faults were created within the PV array. The fault detection and identification approach was verified on various line-line faults that were created between strings 1 and 2. The fault analysis was undertaken at 750 W/m² and 800 W/m² irradiance levels. The threshold was calculated using equation (4) which was 0.45 and 0.5 at 750 W/m² and 800 W/m² during fault free conditions respectively. The fault detection and identification results observed from experiments are given in Table 6.

The results confirm embodiments of the present invention are capable of successfully detecting and locating faults regardless of the array configuration. The expected fault location can provide the exact fault location after rounding of the $L_i$ and $L_j$ values. Also, it is noticeable from the Table 6 that efficiency of estimated fault location increases with an increase in experimental fault location.

TABLE 6

Experimental results of fault detection, identification and location for different irradiance in 6 × 3 array

| GHI (W/m²) | Detection | | | | Identification | | Location | | |
|---|---|---|---|---|---|---|---|---|---|
| | Residual | | | | No. of | Fault | | | Accuracy |
| | $r_1$ | $r_2$ | $r_3$ | $\varepsilon_{Th}$ | outliers | type | $L_{x(actual)}$ | $\hat{L}_{x(estimated)}$ | status |
| 750 | 0.40 | 0.21 | 0.22 | 0.33 | 1 | Intra-string | 1 | 1.16 | ✓ |
| 750 | 0.90 | 0.35 | 0.22 | 0.33 | 2 | Cross-string | 1, 3 | 1.50, 2.92 | ✓ |

TABLE 6-continued

Experimental results of fault detection, identification and location for different irradiance in 6 × 3 array

| GHI (W/m²) | Detection | | | | Identification | | Location | | Accuracy status |
|---|---|---|---|---|---|---|---|---|---|
| | Residual | | | | No. of outliers | Fault type | $L_{x(actual)}$ | $\hat{L}_{x(estimated)}$ | |
| | $r_1$ | $r_2$ | $r_3$ | $\varepsilon_{Th}$ | | | | | |
| 750 | 1.13 | 0.22 | 0.21 | 0.33 | 1 | Intra-string | 2 | 2.49 | ✓ |
| 750 | 4.23 | 0.20 | 0.21 | 0.33 | 1 | Intra-string | 4 | 4.64 | ✓ |
| 750 | 8.64 | 0.34 | 0.19 | 0.33 | 2 | Cross-string | 1, 6 | 1.14, 5.41 | ✓ |
| 750 | 11.8 | 0.19 | 0.19 | 0.33 | 1 | Intra-string | 6 | 6.16 | ✓ |
| 800 | 6.27 | 0.60 | 0.26 | 0.36 | 2 | Cross-string | 1, 4 | 1.14, 4.03 | ✓ |
| 800 | 1.27 | 0.57 | 0.25 | 0.36 | 2 | Cross-string | 5, 6 | 4.52, 5.89 | ✓ |
| 800 | 3.5 | 0.25 | 0.24 | 0.36 | 1 | Intra-string | 2 | 2.40 | ✓ |
| 800 | 8.8 | 0.26 | 1.24 | 0.36 | 1 | Intra-string | 4 | 4.41 | ✓ |
| 800 | 11 | 0.24 | 0.25 | 0.36 | 1 | Intra-string | 5 | 5.35 | ✓ |
| 800 | 0.43 | 0.25 | 0.24 | 0.36 | 1 | Intra-string | 6 | 6.14 | ✓ |
| Fault location accuracy | | | | | | | | | 100% |

Extension of Approach for any Array Size

It is desirable to extend the approach for any array size so as to enhance its portability to various PV array configurations with minimal effort. Given a fault location estimation expression for a specific array configuration, this section proposes approaches to re-model the expression to suit other PV array configurations with varying modules, strings and temperature.

Variation in Number of Modules

The effect of a varying number of modules (m) in a string was considered. The rest of the parameters (G, n, T) were kept unchanged. The relationship between the fault location and string current levels for different string sizes was analysed. Different arrays with a varying number of modules within each string (3×3, 5×3, 7×3, 9×3) were simulated. The string current magnitudes vs fault locations were gathered and presented in FIGS. 16A-16D from which it may be observed that even though the number of modules in a string changes, the range of current magnitudes remains the same.

FIGS. 16A-16D respectively represent current magnitudes with varying number of modules in a string (FIG. 16A) 3×3, (FIG. 16B) 5×3, (FIG. 16C) 7× 3, (FIG. 16D) 9×3 and locations at 1000 W/m². With this observation, the following expression is proposed:

$$s_{new} = s_{old} \times \frac{m_{old}}{m_{new}}. \quad (8)$$

where $s_{old}$ denotes the slope of the line which characterises current versus location characteristics, snow represents the slope corresponding to the current versus location characteristics for the new array configuration for which the fault location expression is to be remodelled, $m_{old}$ and $m_{new}$ represent number of modules in the existing string and new string, respectively.

Figure 17:
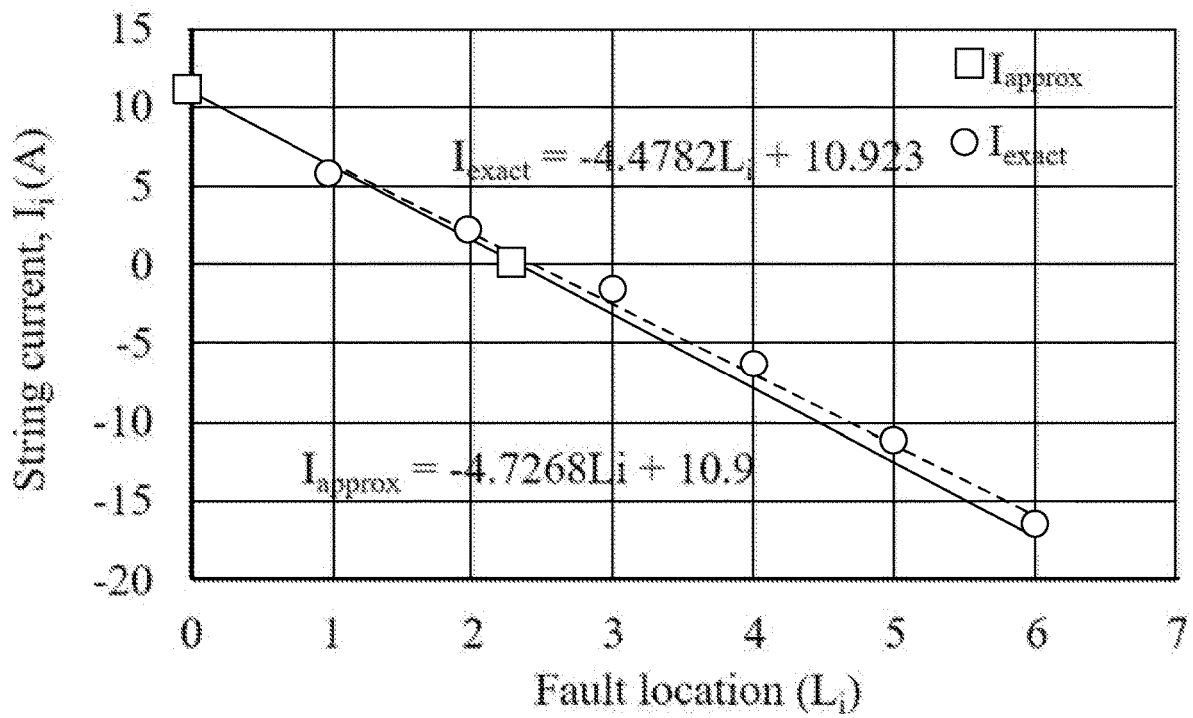
FIG. 17 is a graph comparing actual and approximated characteristics in a validation scenario where the fault location expression for a 6×3 array is obtained using an expression derived and validated for a 4×3 array.

For validation, consider a scenario whereby it is desired to obtain the fault location expression for a 6×3 array using an expression derived and validated for a 4×3 array. In this situation, the slope of the line characterising current vs fault location can be obtained using Eq. (7). FIG. 17 shows the comparison between the actual and approximated characteristics. Once $s_{new}$ is known, the new current ($I_{i(new)}$) for any string size can be obtained using Eq. (9).

$$I_{i(new)} = I_i \times \frac{m_{old}}{m_{new}}. \quad (9)$$

where $m_{old}$ and $m_{new}$ are number of modules in old and new array respectively. The fault location expression for a new array size can be obtained by substituting Eq. (9) in Eq. (5). The approach was validated on 6×3 arrays and results are revealed in Table 7. The results confirm the ability of the proposed approach to generalise for m number of modules in a string with reasonable fault location accuracy.

TABLE 7

Fault location estimation in a 6 × 3 array using an expression derived from a 4 × 3 array

| Irradiation (G) | String current ($I_i$) | Location | | Accuracy |
|---|---|---|---|---|
| | | $L_{i(actual)}$ | $\hat{L}_{i(estimated)}$ | |
| 1000 | 5.60 | 1 | 0.63 | 63% |
| 1000 | 2.15 | 2 | 1.52 | 76% |
| 1000 | −1.84 | 3 | 3.54 | 84% |
| 1000 | −6.34 | 4 | 4.48 | 89% |
| 1000 | −11.31 | 5 | 5.33 | 93% |
| 1000 | −16.77 | 6 | 6.29 | 95% |

Figure 18:
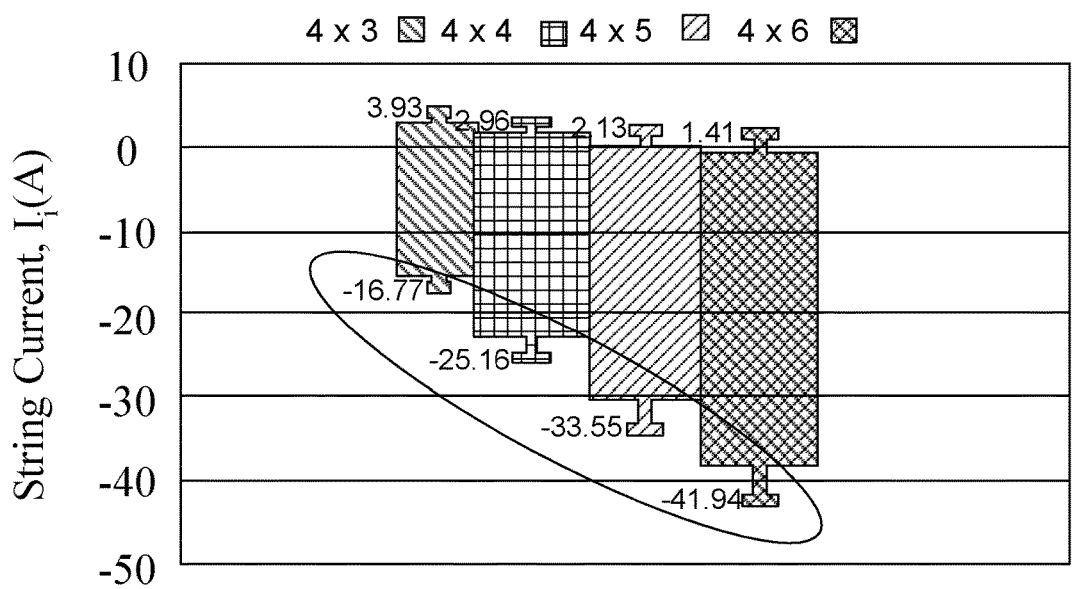
FIG. 18 is a graph providing insight into string current and fault location for various array combinations.

The fault location approach that has previously been discussed was considered for a varying number of strings (n) in an array using Eq. (2). The parameters (G, m, T) were kept constant to analyse fault current magnitudes with a change in string numbers. To get insight into string current ($I_i$) and fault location ($L_i$), various array combinations with number of strings (4×3, 4×4, 4×5, 4×6) were simulated and plotted as shown in FIG. 18. The string current magnitudes ($I_i$) in FIG. 18 show a linear shift with number of parallel strings. Therefore, scaling of the string numbers with the string current magnitudes can be used for approximating the characteristics of any number of strings.

From the characteristics observed in FIG. 12, the following expression was proposed:

$$s_{new} = n_{ratio} \times n_{old} \times n_{new}. \tag{10}$$

where $s_{new}$ is the slope of the line which characterises current versus location of new string, $n_{ratio}$ denotes ratio of old and new strings numbers, $n_{old}$ and $n_{new}$ represents number of old and new strings respectively.

Figure 19:
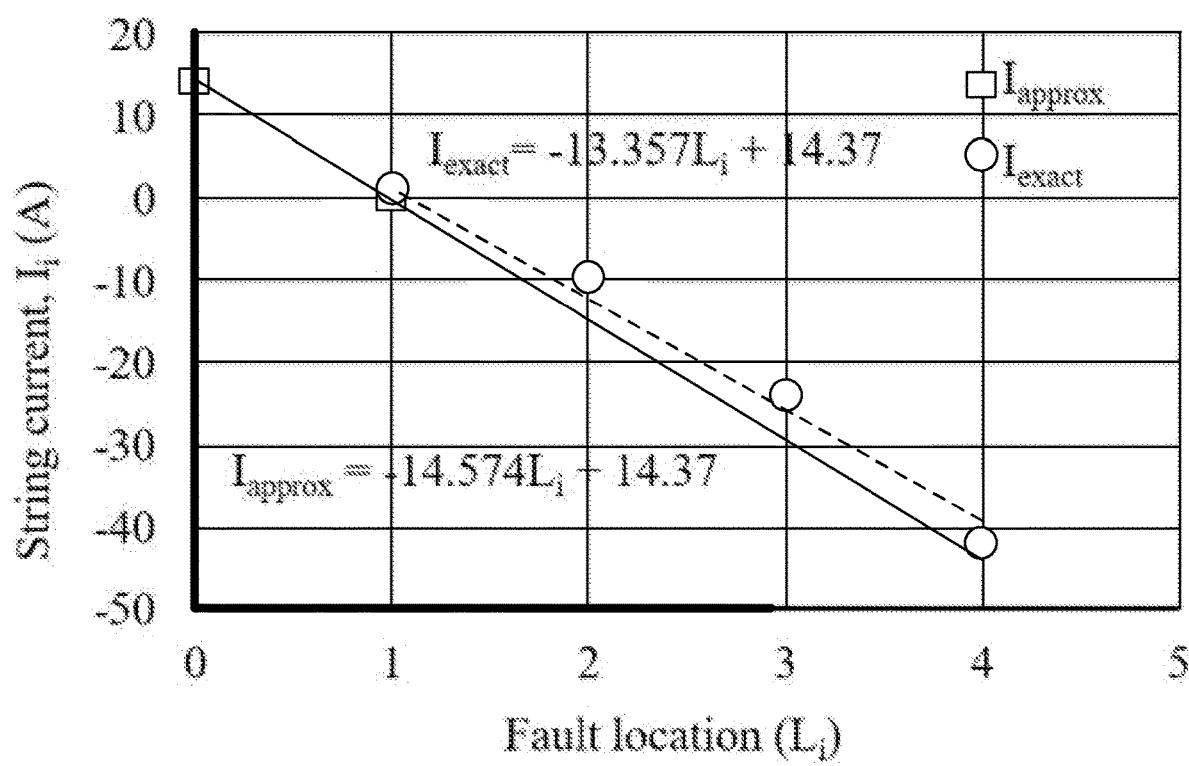
FIG. 19 is a graph showing a trend in the string fault currents with variations in number of strings.

To validate the effect of string characteristics, it is desirable to obtain the expression for a 4×6 array using an expression derived and validated for a 4×4 array. In this case, the slope of the line characterising current vs fault location B can be obtained using Eq. (7). FIG. 19 shows a trend in the string fault currents with variations in number of strings. This trend is captured in the form of actual and approximated characteristics. Once the slope of $s_{new}$ was known, the new string current for any string numbers in array can be obtained through Eq. (11). The expression for estimated fault location is given in Eq. (11):

$$I_{i(new)} = I_i \times \frac{n_{new}}{n_{old}}. \tag{11}$$

The estimated fault location expression for the new array size can be obtained by substituting Eq. (11) in Eq. (7). The given approach was verified on 4×4 array and the results are shown in Table 8. The results confirm that the proposed approach is capable of generalising fault location estimation for n number of strings with good accuracy.

Since the temperature (T) has less dependency on the $I_{sc}$ of a PV module, the string current may be affected only slightly with major change in T and is therefore usually ignored. The proposed approach was verified by changing the T as per Eq. (2) and keeping other parameters (G, m, n) constant. It was observed from the simulations that the temperature change has a negligible effect on the string currents which does not affect the fault detection and location.

TABLE 8

Fault location estimation for 4 × 4 array using an expression derived from a 4 × 6 array

| Irradiation (G) | String current ($I_i$) | $L_{i(actual)}$ | $\hat{L}_{i(estimated)}$ | Accuracy |
|---|---|---|---|---|
| 1000 | 2.96 | 1 | 1.43 | 69% |
| 1000 | −4.64 | 2 | 2.38 | 84% |
| 1000 | −13.98 | 3 | 3.32 | 90% |
| 1000 | −25.16 | 4 | 4.28 | 93% |

In order to evaluate the effect of Maximum Power Point Tracking (MPPT) on the validity of the proposed method, additional simulations were performed with MPPT. In particular, in order to clarify the effects of MPPT on the proposed method, simulation analysis was performed with MPPT on the 4×4 array for a range of irradiance conditions. Faults were created in string 1 only, therefore, the residual values ($r_1$) for string 1 only are shown. Different irradiance levels and fault locations were considered to encompass the effects of irradiance levels and fault locations relative to without and with MPPT. The results are summarised in Table 9.

TABLE 9

Experimental results with MPPT effect on 4 × 4 array

| G (W/m²) | String current | | | | Residual ($r_1$) | $\varepsilon_{Th}$ | Location | | |
|---|---|---|---|---|---|---|---|---|---|
| | $I_1$ | $I_2$ | $I_3$ | $I_4$ | | | $L_{i(actual)}$ Actual | $\hat{L}_{i(estimated)}$ Estimate | Accuracy |
| 1000 | 2.87 | 7.62 | 7.62 | 7.62 | 0.55 | 0.31 | 1 | 0.97 | 97% |
| 900 | −2.39 | 6.98 | 6.98 | 6.98 | 0.50 | 0.33 | 2 | 2.14 | 93% |
| 800 | −8.21 | 6.14 | 6.14 | 6.14 | 0.45 | 0.34 | 3 | 3.36 | 89% |
| 700 | −15.56 | 4.89 | 4.89 | 4.89 | 0.40 | 0.36 | 4 | 4.18 | 96% |

From the results, it can be seen that the net effect of MPPT is the overall slight drop in currents in all the strings when compared with without MPPT. This drop was caused by the voltage adjustments by MPPT to maximise power yield. Nonetheless, the relative current differential between the faulted and fault-free strings was maintained and the pattern in which fault current varies relative to fault location was the same without and with MPPT. The results confirm that the pattern of current variations relative to fault location is consistent between without and with MPPT. Consequently, the proposed method is valid for both without and with MPPT scenarios.

In practice, methods according to embodiments of the present invention can be implemented by a suitably programmed server, for example server 23 as previously discussed or by a microcontroller or programmable logic controller (PLC), which monitors the string currents and diagnoses the fault.

With reference again to FIG. 3, in use the server 23 continuously monitors the current values for each string that are transmitted to it by string current sensors 19-1, . . . , 19-$m$ across data network 21. The values are typically logged in database 25 along with the time and date that they are recorded. The server 23, implementing the method of FIG.

4, which is coded as instructions comprising software product 27, continuously calculates the representative current and checks to determine if the current residuals indicate the operation of one or two of the strings as being fault-affected, either by an intra-string fault or by a cross string fault. In the event of a fault being detected then the server 23 raises an alarm which is a term than encompasses simple notifications such as an electronic message that is transmitted across the data network 21 to a remote device 12 of an administrator 6. Upon receiving the alarm message, which includes fault location information, administrator 6 is able to travel to the location of the fault in the solar array and take action to rectify the fault.

In the embodiments that have been described, each of the strings consists of a number of series connected PV modules.

It will be understood that a PV module could comprises a single solar PV panel or a block of series and/or parallel connected solar PV cells, for example.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described herein comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the scope of the invention.

The invention claimed is:

1. A method for detecting a fault affecting one or more strings of a plurality of strings each comprised of a number of Photovoltaic (PV) solar modules in series, the method comprising:
    determining a representative string current for currents of the plurality of strings;
    deeming one or more strings having currents that are outliers to the representative string current by more than a threshold value to be subject to a fault;
    determining a fault location in terms of a number of PV modules along a string that is deemed to be subject to a fault; and
    determining the fault location as a function of current through the string that is subject to the fault and of solar irradiance upon the PV modules.

2. The method of claim 1, wherein the representative string current comprises a mean $\bar{I}_a$ of the currents of all of the strings and the plurality of strings comprise strings $I_1, \ldots, I_n$ and the string current through the $i^{th}$ string is $I_i$ and the sum of string currents $I_a$ of the currents of the plurality of strings is:

$$I_a = \sum_{i=1}^{n} I_i$$

and the mean current for each string of the array is:

$$\bar{I}_a = \frac{I_a}{n}.$$

3. The method of claim 1, wherein the representative string current comprises a mid-range value of string currents of the plurality of strings.

4. The method of claim 1, including monitoring a current through each string to determine the representative string current.

5. The method of claim 1 wherein the fault is identified to be a cross-string fault and the method preferably involves initially identifying the fault location on a first one of the cross-string fault affected strings and then using that fault location to find a fault location on the second of the cross-string fault affected strings.

6. The method of claim 1 including generating the function by modelling an array for a plurality of faults.

7. A non-transitory computer readable storage medium storing instructions that, when executed by a processor of a fault detection assembly, are configured to cause the fault detection assembly to perform operations corresponding to the method of claim 1.

8. A method for detecting a fault affecting one or more strings of a plurality of strings each comprised of a number of Photovoltaic (PV) solar modules in series, the method comprising:
    determining a representative string current for currents of the plurality of strings;
    deeming one or more strings having currents that are outliers to the representative string current by more than a threshold value to be subject to a fault;
    wherein the representative string current comprises a mean $\bar{I}_a$ of the currents of all of the strings and the plurality of strings comprise strings $I_1, \ldots, I_n$ and the string current through the $i^{th}$ string is $I_i$ and the sum of string currents $I_a$ of the currents of the plurality of strings is:

$$I_a = \sum_{i=1}^{n} I_i$$

and the mean current for each string of the array is:

$$\bar{I}_a = \frac{I_a}{n},$$

and
    wherein the deeming of the one or more strings having currents that are outliers to the representative string current by more than a threshold value to be subject to a fault includes determining, for each string current a residual $r_1, \ldots, r_n$ where:

$$r_i = |I_i - \bar{I}_a|, \forall i = [1, n].$$

9. The method of claim 8, including deeming an intra-string fault to be present in the $i^{th}$ string according to:

$$|r_i| < \varepsilon_{Th} \Rightarrow \text{No fault}$$

$$|r_i| > \varepsilon_{Th} \Rightarrow \text{Fault present in the } i^{th} \text{ string}$$

where $\varepsilon_{Th}$ is the threshold value.

10. The method of claim 9, wherein the threshold value is determined by measuring currents through each string in relation to a representative string current for currents of the plurality of strings when all of the strings are in a no-fault condition.

11. The method of claim 10, including estimating the threshold value according to:

$\varepsilon_{Th} = \sup \|r_i\|_2,$ $\forall i \in [1,n]$ whilst all of the strings are in a no-fault condition and wherein 'sup' represents the supremum and $\varepsilon_{Th}$ is the greatest lower bound on the norm bounded values of string current residuals.

12. The method of claim 8, including deeming a cross string-fault to be present between $i^{th}$ and $j^{th}$ strings according to:

$\exists i,j \in [1,n] r_i > \varepsilon_{Th}$ and $r_j < \varepsilon_{Th}$ where, $r_i = |I_i - \bar{I}_a|$ and $r_j = |I_j - \bar{I}_a|$
where $\varepsilon_{Th}$ is the threshold value.

13. A fault detection assembly for a Photovoltaic (PV) solar generation assembly comprised of an array of PV modules including a plurality of series PV module strings connected in parallel, the fault detection assembly including:
a plurality of current sensors arranged to monitor respective string currents of said strings;
a processor in communication with the current sensors configured to receive values of the string currents therefrom;
a memory accessible to the processor, the memory including instructions for execution by the processor to perform operations comprising:
determining a representative string current for currents of the plurality of strings;
deeming one or more strings having currents that are outliers to the representative string current by more than a threshold value to be subject to a fault;
determining one or more fault locations for the one or more strings deemed to be subject to the fault;
identifying the one or more fault locations as a function of current through one or more strings that are subject to the fault and of solar irradiance upon the PV modules; and
issuing an alarm including an identification of the one or more strings deemed to be subject to the fault.

14. The fault detection assembly of claim 13, wherein the representative string current comprises a mean $\bar{I}_a$ of the currents of all of the strings and the plurality of strings comprise strings $I_1, \ldots, I_n$ and the string current through the $i^{th}$ string is $I_i$ and the sum of string currents $I_a$ of the currents of the plurality of strings is:

$$I_a = \sum_{i=1}^{n} I_i$$

and the mean current for each string of the array is:

$$\bar{I}_a = \frac{I_a}{n}.$$

15. The fault detection assembly of claim 14, wherein the deeming of the one or more strings having currents that are outliers to the representative string current by more than a threshold value to be subject to a fault includes determining, for each string current a residual $r_1, \ldots, r_n$ where:

$r_i = |I_i - \bar{I}_a|, \forall i = [1,n].$

16. The fault detection assembly of claim 15, wherein an intra-string fault is deemed to be present in the $i^{th}$ string according to:

$|r_i| < \varepsilon_{Th} \Rightarrow$ No fault $|r_i| < \varepsilon_{Th} \Rightarrow$ Fault present in the $i^{th}$ string where $\varepsilon_{Th}$ is the threshold value.

17. The fault detection assembly of claim 15, cross string-fault is deemed to be present between $i^{th}$ and $j^{th}$ strings according to:

$\exists i,j \in [1,n] r_i > \varepsilon_{Th}$ and $r_j < \varepsilon_{Th}$ where, $r = |I_i - \bar{I}_a|$ and $r_j = |I_j - \bar{I}_a|$
where $\varepsilon_{Th}$ is the threshold value.

18. The fault detection assembly of claim 17, wherein the threshold value is determined by measuring currents through each string in relation to a representative string current for currents of the plurality of strings when all of the strings are in a no-fault condition.

19. The fault detection assembly of claim 18, wherein the threshold value is estimated according to:

$\varepsilon_{Th} = \sup \|r_i\|_2,$ $\forall i \in [1,n]$ whilst all of the strings are in a no-fault condition and wherein 'sup' represents the supremum and $\varepsilon_{Th}$ is the greatest lower bound on the norm bounded values of string current residuals.

20. The fault detection assembly of claim 13, wherein the processor is further configured to monitor a current through each string to determine the representative string current.

21. The fault detection assembly of claim 20, wherein the fault is identified to be a cross-string fault.

22. The fault detection assembly of claim 21, wherein the fault location is initially identified on a first one of the cross-string fault affected strings and then that fault location is used to find a fault location on the second of the cross-string fault affected strings.

* * * * *